United States Patent
Kang et al.

(10) Patent No.: US 10,602,230 B2
(45) Date of Patent: Mar. 24, 2020

(54) APPARATUS AND METHOD FOR CONTROLLING MEDIA OUTPUT LEVEL

(71) Applicant: SAMSUNG ELECTRONICS CO., LTD., Suwon-si (KR)

(72) Inventors: Woo Seok Kang, Suwon-si (KR); Doo Hyun Kim, Suwon-si (KR); Sang Kwon Na, Suwon-si (KR); Ki Won Yoo, Suwon-si (KR); Chul Woo Lee, Suwon-si (KR); Jin Joo Chung, Suwon-si (KR); Doo Chan Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/196,819

(22) Filed: Nov. 20, 2018

(65) Prior Publication Data
US 2019/0158926 A1 May 23, 2019

(30) Foreign Application Priority Data

Nov. 22, 2017 (KR) .......................... 10-2017-0156636

(51) Int. Cl.
*H04N 21/485* (2011.01)
*H04N 21/439* (2011.01)
(Continued)

(52) U.S. Cl.
CPC ..... *H04N 21/4852* (2013.01); *H04N 21/4104* (2013.01); *H04N 21/42204* (2013.01);
(Continued)

(58) Field of Classification Search
CPC ........... H04N 21/4852; H04N 21/4104; H04N 21/42204; H04N 21/43615; H04N 21/439;
(Continued)

(56) References Cited

U.S. PATENT DOCUMENTS

| 2006/0153405 A1* | 7/2006 | Myers ................. H03G 3/3005 381/107 |
| 2008/0192958 A1* | 8/2008 | Nakata ................. H03G 3/001 381/107 |

(Continued)

FOREIGN PATENT DOCUMENTS

| EP | 2608563 A1 | 6/2013 |
| EP | 3373591 A1 | 9/2018 |

(Continued)

OTHER PUBLICATIONS

Communication dated Feb. 11, 2019, issued by the European Patent Office in counterpart European Patent Application 18207366.8.

(Continued)

*Primary Examiner* — Michael Lee
(74) *Attorney, Agent, or Firm* — Sughrue Mion, PLLC

(57) ABSTRACT

A device may receive a request associated with adjusting the media output level of a sink device that is configured to output media content. The device may identify a source gain of a source device that is configured to provide the media content to the sink device, and a sink gain of the sink device. The device may identify a sink adjustment value for changing the sink gain based on the request for adjusting the media output level of the sink device, the source gain, and the sink gain. The device may transmit, to the sink device, a control signal to permit the sink gain to be changed based on the sink adjustment value. The media output level of the sink device is based on the source gain and the sink gain.

28 Claims, 26 Drawing Sheets

(51) Int. Cl.
  *H04N 21/41* (2011.01)
  *H04N 21/422* (2011.01)
  *H04N 21/436* (2011.01)
  *H04S 7/00* (2006.01)

(52) U.S. Cl.
  CPC ..... *H04N 21/439* (2013.01); *H04N 21/43615* (2013.01); *H04N 21/4854* (2013.01); *H04R 2227/003* (2013.01); *H04R 2227/005* (2013.01); *H04S 7/308* (2013.01)

(58) Field of Classification Search
  CPC .......... H04N 21/4854; H04R 2227/003; H04R 2227/005; H04S 7/308
  USPC ......................................................... 348/738
  See application file for complete search history.

(56) References Cited

U.S. PATENT DOCUMENTS

| | | | |
|---|---|---|---|
| 2010/0284543 A1 | 11/2010 | Sobota et al. | |
| 2013/0089006 A1 | 4/2013 | Huang et al. | |
| 2013/0106635 A1* | 5/2013 | Doi | H03M 1/66 341/144 |
| 2014/0162625 A1 | 6/2014 | Zhao et al. | |
| 2014/0211097 A1 | 7/2014 | Oh | |
| 2015/0293744 A1 | 10/2015 | Bae et al. | |
| 2016/0142029 A1* | 5/2016 | Putta | H04R 3/00 381/107 |
| 2016/0147692 A1* | 5/2016 | Altmann | G06F 13/4022 710/316 |
| 2017/0026820 A1 | 1/2017 | Han et al. | |
| 2017/0195471 A1 | 7/2017 | Jones et al. | |
| 2018/0167715 A1* | 6/2018 | Graylin | G10K 11/17827 |
| 2019/0028762 A1 | 1/2019 | Zeng et al. | |

FOREIGN PATENT DOCUMENTS

| | | |
|---|---|---|
| FR | 3049754 A1 | 10/2017 |
| KR | 10-2014-0098545 A | 8/2014 |
| WO | 2010/076215 A1 | 7/2010 |
| WO | 2017/075988 A1 | 5/2017 |

OTHER PUBLICATIONS

Search Report dated Mar. 20, 2019, issued by the International Searching Authority in counterpart International Patent Application No. PCT/KR2018/014261 (PCT/ISA/210).

Written Opinion dated Mar. 20, 2019, issued by the International Searching Authority in counterpart International Patent Application No. PCT/KR2018/014261 (PCT/ISA/237).

Communication dated Sep. 25, 2019, issued by the European Patent Office in counterpart European Application No. 18207366.8.

* cited by examiner

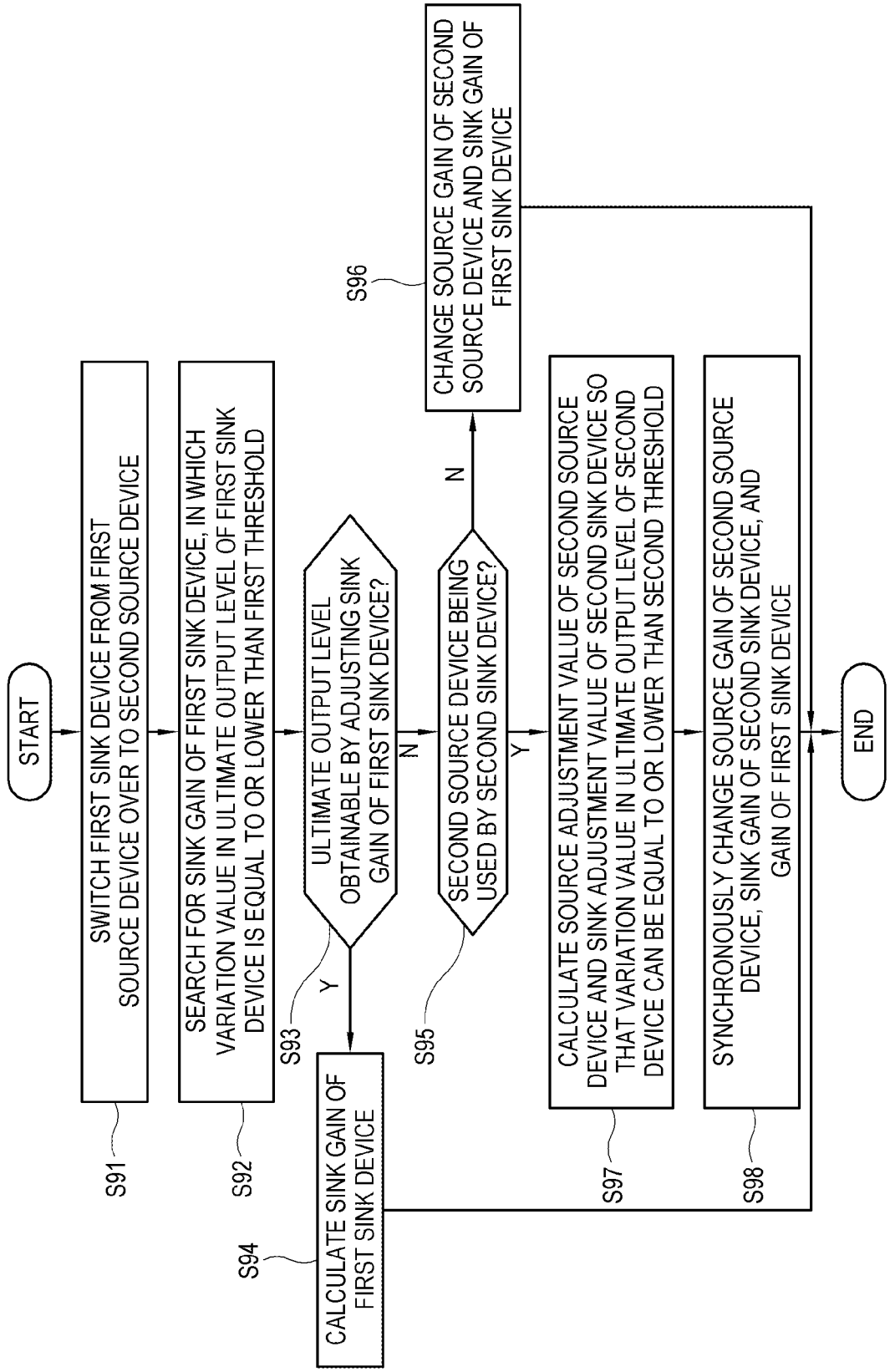

APPARATUS AND METHOD FOR CONTROLLING MEDIA OUTPUT LEVEL

CROSS-REFERENCE TO RELATED APPLICATION

The application is based on and claims priority under 35 U.S.C. § 119 to Korean Patent Application No. 10-2017-0156636, filed on Nov. 22, 2017, in the Korean Intellectual Property Office, the disclosure of which is incorporated by reference herein in its entirety.

BACKGROUND

1. Field

The disclosure relates to an apparatus and method for controlling a media output level, and more particularly to an apparatus and method for adaptively adjusting an output level when a sink device outputs a media source provided by a source device, in an environment where at least one source device and at least one sink device are connected through a network.

2. Description of the Related Art

Recently, various source and sink devices have been provided for home use, and thus there has been a growing interest in a multimedia network system where multimedia streaming is performed between such devices.

Building such a multimedia network system involves some technical problems: it is required to provide a multi-user environment using a wired or wireless network at home; enhance convenience in device control under an environment that a screen can be arranged at any place ('Screen Everywhere'); and solve inconvenience and collision problems that arise while controlling various multimedia devices in the multi-user environment.

Typically, control of devices in a multi-device environment has been achieved in such a manner that a user uses separate controllers (e.g., remote controllers) that respectively correspond to the devices. To solve inconvenience of using many controllers, there has recently been proposed a method of employing one controller in controlling both the source device and the sink device. For example, the controller of the sink device with a display is configured to receive a user's input, and control the source device through a control interface such as high definition multimedia interface (HDMI)-consumer electronics control (CEC), Infrared (IR)-Blaster, etc.

Under a single display-device environment where only one digital television becomes the center at home, a fault in such a conventional method does not easily stick out. However, with a trend toward an increasing number of digital devices and individualization of family members, the single display-device environment is highly likely to change into a multi-user-device environment, under which a plurality of televisions and mobile devices are concurrently used at home, in the future.

Under the multi-user-device environment, when two users are using their own sink device or display device to receive media from one source device, authority to control the source device is exclusively given to only the user who has a matching controller. When characteristics of a channel are taken into account, it is natural that only one person has authority to change a channel. However, it is not suitable for the multi-user-device environment if favorite media characteristics such as volume, sound quality, image quality, etc. are under control of only one user.

In the foregoing conventional method, many users are allowed to control one source device, but it is difficult to solve a problem that users inconvenience one another under the multi-user-device environment because one user's control to change the favorite media characteristics concerns another user.

SUMMARY

Aspects of the disclosure meet various requirements of many users at a time through an integrated control system between devices under a multi-user-device environment.

An aspect of the disclosure may enhance control convenience by providing an integrated user interface (UI) for controlling media characteristics so that a source device and a sink device can be controlled at a time.

The technical problems to be solved in the disclosure are not limited to the foregoing technical problems, and other technical problems not mentioned above will become apparent for those skilled in the art from the disclosure.

According to an aspect of the disclosure, there is provided a device for controlling a media output level that includes a memory configured to store at least one program, and a processor configured to execute the at least one program to receive a request associated with adjusting the media output level of a sink device that is configured to output media content; identify a source gain of a source device that is configured to provide the media content to the sink device, and a sink gain of the sink device; identify a sink adjustment value for changing the sink gain based on the request for adjusting the media output level of the sink device, the source gain, and the sink gain; and transmit, to the sink device, a control signal to permit the sink gain to be changed based on the sink adjustment value, wherein the media output level of the sink device is based on the source gain and the sink gain.

The processor is configured to generate a user interface (UI) that permits a user of the device to adjust the media output level; and provide the UI to the sink device.

The device receives a user input via the UI, or receives a user input signal from the sink device.

The processor is configured to store an updated source gain based on a changed source gain, and store an updated sink gain based on a changed sink gain.

The processor is configured to store a mapping table that includes a correlation between the media output level and the source gain and the sink gain.

The mapping table is received from the sink device.

The processor is configured to store first media properties supported in the source device and second media properties supported in the sink device, wherein the source gain and the sink gain are gains related to common media properties between the first media properties and the second media properties.

The media properties may comprise at least one of audio properties or video properties.

The audio properties may comprise at least one among volume, treble boost, bass boost, reverb, voice amplification, and sound field effects, and the video properties comprise at least one among brightness, contrast, chroma, sharpness, and deblock filtering.

The source device comprises a device for providing the media content received from a communication network or storage medium, and the sink device comprises an audio output device for outputting sound associated with the media content, and a display device for outputting images associated with the media content.

The device is integrated with the sink device.

The device is integrated with a hub device for relaying a media transmission channel between the source device and the sink device.

The processor is configured to identify a requested media output level based on the request associated with adjusting the media output level of the sink device; identify whether the requested media output level is capable of being achieved based on only an adjustment of the sink gain; and selectively transmit, to the source device, another control signal to permit the source gain to be changed based on whether the requested media output level is capable of being achieved based on only the adjustment of the sink gain.

The processor is configured to identify a source adjustment value for changing the source gain based on the request for adjusting the media output level of the sink device; identify another sink adjustment value, for changing another sink gain of another sink device that is connected to the source device, based on the source adjustment value; and transmit, to the other sink device, the other sink adjustment value to permit the other sink gain to be changed based on the other sink adjustment value.

The processor is configured to identify a source adjustment value for changing the source gain based on the request for adjusting the media output level of the sink device; identify that a variation value, associated with another media output level of another sink device that is connected to the source device, satisfies a threshold based on the source adjustment value; and transmit, to the source device, another control signal to permit the source gain to be changed based on the source adjustment value based on identifying that the variation value satisfies the threshold.

The processor is configured to identify the source adjustment value that permits a minimum variation value associated with the other media output level of the other sink device.

The processor is configured to identify the source adjustment value that permits a minimum variation value associated with the source gain.

The processor is configured to identify the sink adjustment value based on the source adjustment value, the sink gain, and a requested media output level associated with the request for adjusting the media output level.

The processor is configured to identify a variation value associated with the media output level based on the sink device being switched from being connected to the source device to another source device; identify whether another sink adjustment value for changing the sink gain is capable of causing the variation value to satisfy a threshold; and selectively identify a source adjustment value for changing a source gain of the other source device based on whether the other sink adjustment value is capable of causing the variation value to satisfy the threshold.

The processor is configured to identify that the sink device is switched from being connected to the source device to another source device, wherein the other source device is connected to another sink device; and cause respective changes in the source gain of the source device, another source gain of the other source device, the sink gain, and another sink gain of the other sink device based on identifying that the sink device is switched from being connected to the source device to the other source device.

The processor is configured to identify that the sink device is switched from being connected to the source device to being connected to another source device; identify a source adjustment value of the other source device that permits a variation value in the media output level of the sink device to satisfy a threshold; identify another sink adjustment value of another sink device that is connected to the other source device that permits a variation value in a media output level of the other sink device to satisfy another threshold; and cause a source gain of the other source device to be adjusted based on the source adjustment value, and cause a sink gain of the other sink device to be adjusted based on the other sink adjustment value.

The processor is configured to identify the source adjustment value that permits a minimum variation value in the media output level of the other sink device.

The processor is configured to identify the source adjustment value and the other sink adjustment value to permit the variation value in the media output level of the other sink device to satisfy the other threshold, and to permit a variation value of a source gain of the other source device to satisfy a gain threshold.

The processor is configured to identify the sink adjustment value that permits a variation value in the media output level of the sink device to satisfy a threshold.

According to an aspect of the disclosure, there is provided a sink device, which is configured to connect with a source device and output media associated with the source device, and that comprises a memory configured to store at least one program; and a processor configured to execute the at least one program to: receive a user input for changing a media output level of the sink device; identify a source adjustment value for changing a source gain of the source device and a sink adjustment value for changing a sink gain of the sink device in response to the user input; transmit, to the source device, a first control signal that causes the source gain to be adjusted based on the source adjustment value; transmit, to the source device, a first control signal that causes the source gain to be adjusted based on the source adjustment value; and apply the sink adjustment value to the received media to permit the received media to be output in association with the media output level.

The processor is configured to generate a user interface (UI) for allowing a user to adjust the media output level; and provide the UI for display on a display panel.

The UI is displayed in a scale of the media output level based on a combination between the source gain and the sink gain.

The processor is configured to update and store the source gain that is adjusted based on the source adjustment value and the sink gain that is adjusted based on the sink adjustment value.

According to an aspect of the disclosure, there is provided a device for controlling a media output level comprises a memory configured to store at least one program; and a processor configured to execute the at least one program to: receive media information from a source device that is connected to the device; identify a source adjustment value for adjusting a source gain of the received media information, and a sink adjustment value for adjusting a sink gain of a sink device that is connected to the device in response to a request for adjusting the media output level of the sink device; adjust the source gain of the media information based on the source adjustment value; transmit the media information, of which the source gain is adjusted based on the source adjustment value, to the sink device; and transmit, to the sink device, a control signal for requesting a sink gain to be adjusted based on the sink adjustment value, wherein the media output level of the sink device is adjusted based on a combination between the source gain and the sink gain.

BRIEF DESCRIPTION OF THE DRAWINGS

The above and/or other aspects will become apparent and more readily appreciated from the following description of the embodiments, taken in conjunction with the accompanying drawings, in which:

FIGS. 25 and 26 are a block diagram and a flowchart illustrating an embodiment of controlling an ultimate output level under a condition that a plurality of source devices and a plurality of sink devices are present, and a first sink device is switched over from connection with a first source device to connection with a second source device.

DETAILED DESCRIPTION OF EMBODIMENTS

Advantages and features of the disclosure, and methods of achieving them will become apparent from the embodiments described in detail in conjunction with the accompanying drawings. However, the disclosure is not limited to the embodiments set forth herein, but will be embodied in various different forms. The following embodiments are provided to make the disclosure complete and assist a person, who has an ordinary skill in the art to which the disclosure pertains, to understand the scope of the disclosure fully. The disclosure is defined by the scope of the appended claims. Like numerals refer to like elements throughout.

Unless otherwise defined, all the terms (technological and scientific terms) should be understood in common by those skilled in the art to which the disclosure pertains. Further, the terms defined in general dictionaries are not construed as ideal or excessive meanings unless otherwise specially defined. In addition, the terms used herein are for the purpose of describing the embodiments and are not intended to be limiting of the disclosure. Unless otherwise specially mentioned, the singular forms are intended to include the plural forms.

Below, some embodiments of the disclosure will be described with reference to the accompanying drawings.

Figure 1:
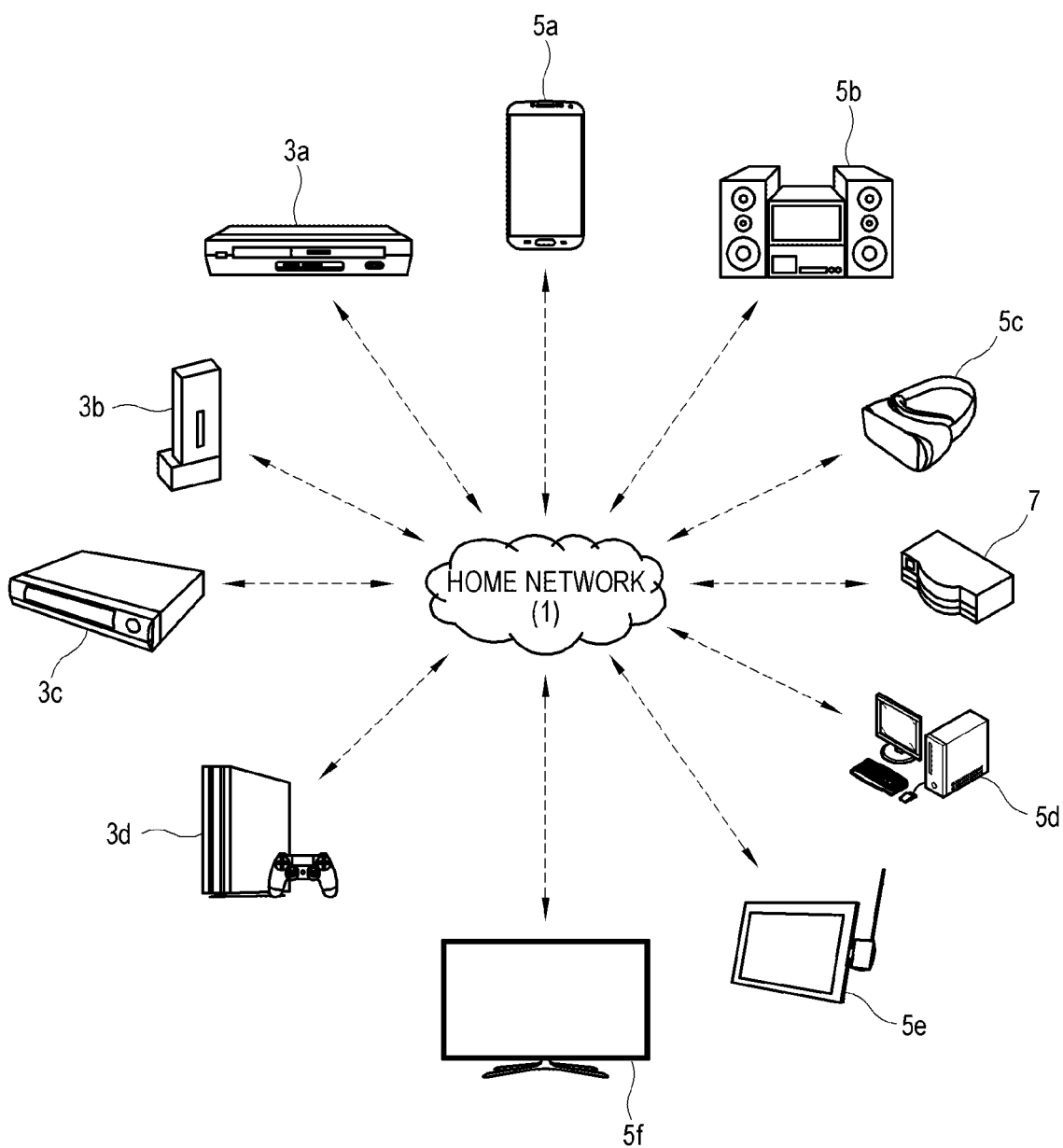
FIG. 1 is a view illustrating a home network environment where various digital devices are connected according to an embodiment.

FIG. 1 is a view illustrating a home network environment where various digital devices are connected according to an embodiment. A home network 1 connects with various source device 3a, 3b, 3c and 3d and various sink devices 5a, 5b, 5c, 5d, 5e and 5f so that the devices can connect and communicate with one another. Further, the home network 1 may connect and communicate with an external network through a network device 7 such as a router, an access point, a switch, etc.

Here, the source devices 3a, 3b, 3c and 3d refer to devices for restoring and reproducing a media source and generating the media source such as a video signal, an audio signal, etc. to be output to a user. The sink devices 5a, 5b, 5c, 5d, 5e and 5f refer to devices for receiving a media signal to display an image on a display panel or output a sound through a loudspeaker. Of course, the sink devices 5a, 5b, 5c, 5d, 5e and 5f may further have a function of receiving a media source via a route separately from the source devices 3a, 3b, 3c and 3d, for example, a sky radio wave, a wide area network (WAN) or a detachable storage medium and directly reproducing and outputting the media source. In the disclosure, the media signal includes a video signal and an audio signal, but are not limited thereto. Alternatively, the media signal may include another kind of signal that can be sensed by a human, for example, a tactile signal, a kinetic signal, etc.

The source devices 3a, 3b, 3c and 3d include an optical disc player 3a for reproducing a media source from a Blu-ray disc (BD), a digital versatile disc (DVD), or the like; an over-the-top (OTT) device 3b for providing media content from the public Internet; a set-top box 3c for providing a media stream from a satellite or an Internet protocol television (IPTV); a game console 3d such as a video game machine; and various similar video and/or audio players.

Further, the sink devices 5a, 5b, 5c, 5d, 5e and 5f include a smart phone 5a; an audio receiver or amplifier 5b; a virtual reality head-mount display (HMD) 5c; a desktop computer 5d; a tablet personal computer (PC) 5e; a digital TV 5f; and various similar video and/or audio output devices. Among them, the digital TV 5f is regarded as a central sink device in the home network 1 since it is connectable with various source devices and includes a relatively large display. Such sink devices 5a, 5b, 5c, 5d, 5e and 5f may be also defined as a media output device since various video and audio media is output as an image or a sound to a user.

Figure 2:
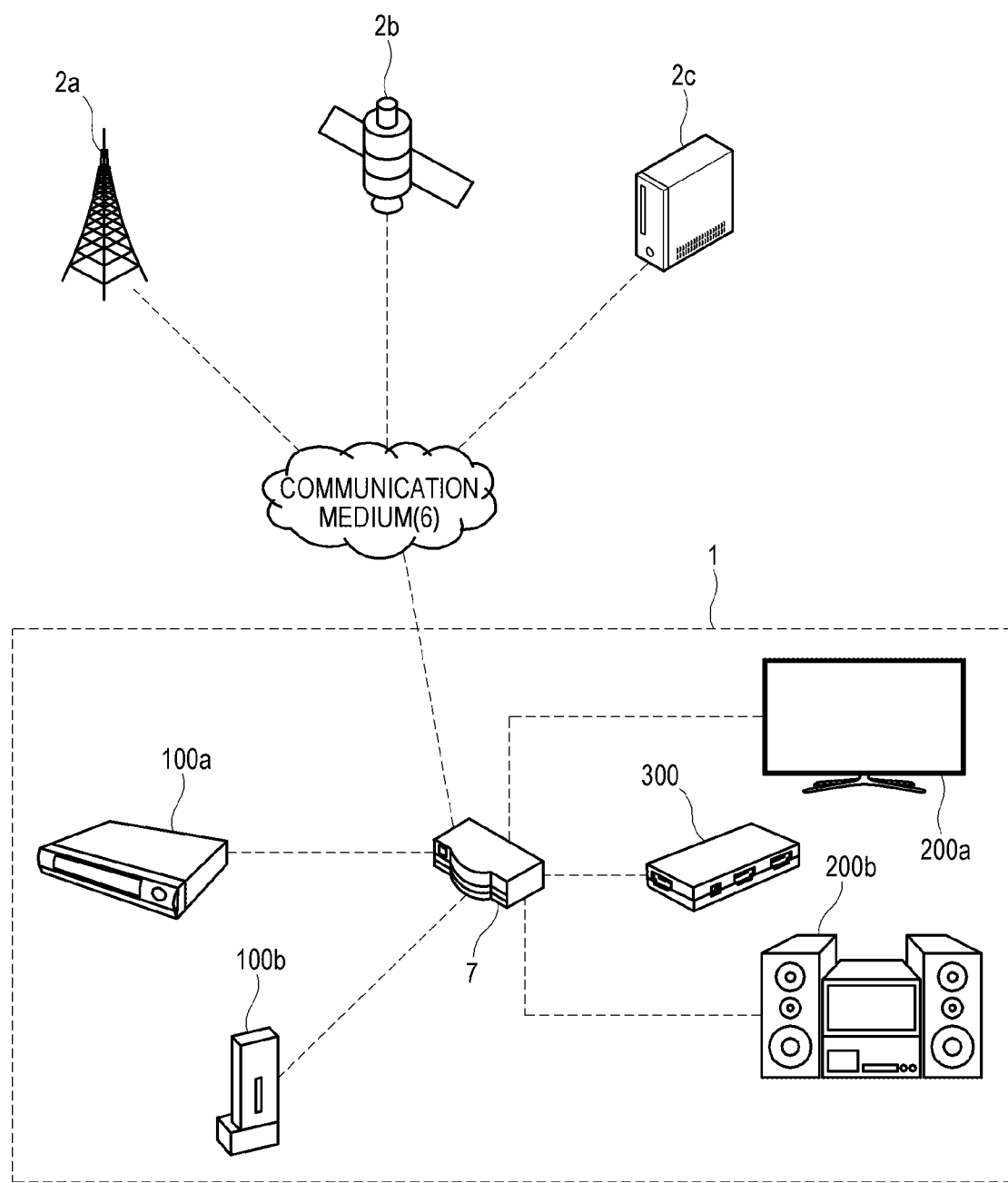
FIG. 2 is a view illustrating an environment where a media source is provided in a home network through a communication medium.

FIG. 2 is a view illustrating an environment where a media source is provided in a home network 1 through a communication medium 6. As shown in FIG. 2, a media stream provided from a cellular network base station or digital broadcasting transmitting station 2a, a communication satellite 2b, and a streaming server 2c on the Internet may be transmitted to a media source device 100a and 100b in the home network 1 through a communication medium 6. Here, the base station or transmitting station 2a refers to a wireless transmitter for transmitting video or audio data through a wireless cellular network or a broadcasting transmitter for transmitting a digital broadcast; a communication satellite 2b refers to a satellite for communication to transmitting data or media at a long distance; and the streaming server 2c refers to a server on the Internet to transmit a broadcast stream of an IPTV or a cable TV. The communication medium 6 may for example be an air medium in a case of terrestrial broadcasting or communication satellite broadcasting; and a wired or wireless communication network in a case of the IPTV or cable broadcasting. The communication network may include a wireless cellular network, the Internet, a WAN, a local area network (LAN), a wire telephone network, a cable network, etc.

However, the media source is not limited to that provided from the outside via the communication medium 6 as shown in FIG. 2, but may be provided to the source devices 100a and 100b via a portable storage medium such as a universal serial bus (USB) memory an optical storage medium, etc. Further, the media source may be provided in a built-in hard disk drive (HDD) and various built-in memories (e.g., a read-only memory (ROM), a basic input/output system (BIOS), etc.) of the source devices 100a and 100b. Further, sink devices 200a and 200b convert the media source received from the source devices 100a and 100b or received remotely into a video, audio, etc. output signal to be recognizable by a user, and provide the output signal.

The external communication medium 6 and the home network 1 may be connected by a network device 7, and communication between them may be relayed by the network device 7. The network device 7 refers to a device for relaying connection with an external network such as a router, an access point, a switch, an IP router, etc. However, a broadcast signal transmitted in the air like terrestrial broadcasting or communicate satellite broadcasting may be directly provided to the source devices 100a and 100b without passing through the network device 7.

Further, the network device 7 connects a plurality of source devices 100a and 100b and a plurality of sink devices 200a and 200b in the home network 1 and relays communication between the devices. Alternatively, the source devices 100a and 100b and the sink devices 200a and 200b may directly connect with each other in the home network 1 without passing information through the network device 7.

The home network 1 may refer to a wireless communication or wired communication network. The wireless communication network may for example be based on Bluetooth, Bluetooth low energy (BLE), controller area network (CAN) communication, Wi-Fi, Wi-Fi Direct, ultra-wide band (UWB) communication, ZigBee, infrared data association (IrDA) communication, near field communication (NFC), etc. Further, the wired communication network may for example be based on a pair cable, a coaxial cable, an optical fiber cable, an Ethernet cable, or the like.

According to an embodiment, there is provided a media output-level control apparatus 300 connected to each of the source device 100: 100a and 100b and the sink device 200: 200a and 200b, and capable of controlling both a source gain (i.e., a gain of the source device) associated with media properties supported in the source device and a sink gain (i.e., a gain of the sink device) associated with media properties supported in the sink device. The media output-level control apparatus 300 may communicate with other devices 100a, 100b, 200a and 200b on the home network 1 through the network device 7, or may directly communicate with other devices 100a, 100b, 200a and 200b without passing information through the network device 7. Further, the media output-level control apparatus 300 may be provided integrally with the network device 7.

Figure 3:
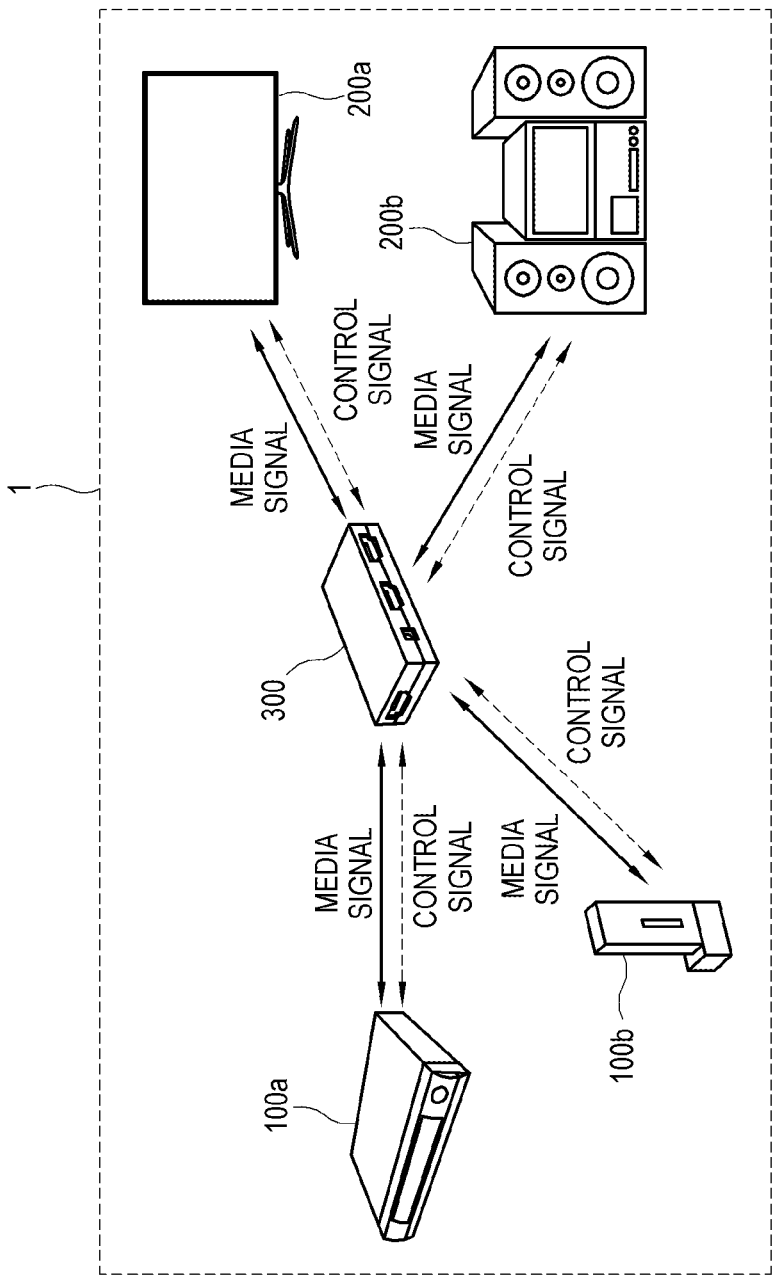
FIG. 3 is a view illustrating a home network structure where a media output-level control apparatus operates as a media hub device according to an embodiment.

FIG. 3 is a view illustrating a structure of the home network 1 where the media output-level control apparatus 300 operates as a media hub device to relay a media signal between the source devices 100a and 100b and the sink devices 200a and 200b according to an embodiment. The media output-level control apparatus 300 may perform a switching operation with regard to a media signal to distribute the media signal from at least one source device 100a or 100b to at least one sink device 200a or 200b.

Typical transmission of the media signal between the source device and the sink device is achieved by a one-to-one connection using an individual wired/wireless link, but there are limits to such a connection where a plurality of source devices and a plurality of sink devices are in the home network 1 and various and changeable connections are needed between the devices. Therefore, the media hub device including an input terminal to which the plurality of source devices is connected and an output terminal to which the sink device is connected may be used for variably switching the transmission of the media signal between both the devices. The media hub device not only supports the one-to-one connection between the source device and the sink device, but also connects one source device to the plurality of sink device or connects the plurality of source devices to one sink device.

The media output-level control apparatus 300 according to an embodiment may be configured integrally with such a media hub device. Therefore, the media output-level control apparatus 300 variably connects a certain source device and a certain sink device to transmit the media signal. Further, the media output-level control apparatus 300 may transmit or receive a control signal to and from the source device and the sink device in response to a request from the sink device to connect with a specific source device, in accordance with information associated with states from the source device and the sink device, for various purposes of controlling the source device and the sink device, etc.

The media signal and the control signal may be transmitted and received through respective separate channels, or one united channel. For example, the channel for transmitting and receiving the control signal may be a public communication network described above with reference to FIG. 2, and the channel for transmitting and receiving the media signal may be a dedicated medial transmission channel (e.g., HDMI, mobile high-definition link (MHL), Miracast, wireless home digital interface (WHDI), etc.) for transmitting the media signal. However, alternatively, both the channels may be united so that the media signal and the control signal can be transmitted and received through one united channel. For example, both the media signal and the control signal may be transmitted or received through the public communication network or a media-based transmission network with an added communication function, like HDMI-CEC, IR-Blaster, etc.

Figure 4:
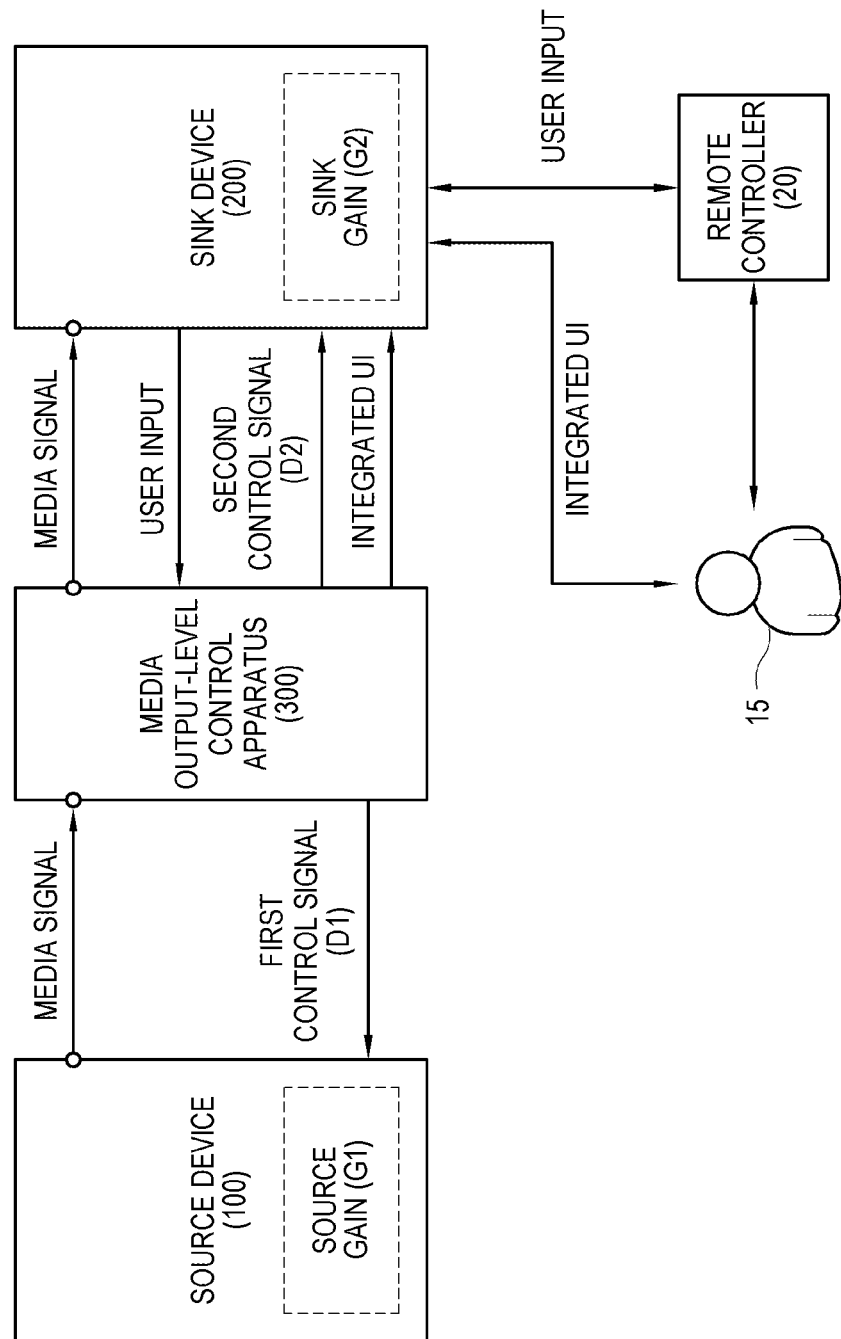
FIGS. 4 and 5 are block diagrams illustrating a home network system environment including a source device, a sink device and a media output-level control apparatus according to an embodiment.

FIG. 4 is a block diagram illustrating a home network system environment including a source device 100, a sink device 200, and a media output-level control apparatus 300 according to an embodiment.

Here, the source device 100 refers to a device capable of restoring and reproducing/playing a media source and generating and outputting a media signal (e.g., a video signal, an audio signal, etc.) to a user, and the sink device 200 refers to a device capable of receiving the media signal and displaying an image on a display panel and a sound through a loudspeaker. Further, the media output-level control apparatus 300 according to an embodiment may connect and communicate with each of the source device 100 and the sink device 200, and control both a source gain G1 associated with the media properties supported in the source device 100 and a source gain G2 associated with the media properties supported in the sink device 200.

To control the source gain G1, the media output-level control apparatus 300 transmits a first control signal including an adjustment value D1 for the source gain G1 to the source device 100. Further, to control the sink gain G2, the media output-level control apparatus 300 transmits a second control signal including an adjustment value D2 for the sink gain G2 to the sink device 200.

That is, unlike the conventional method, the media output-level control apparatus 300 synchronously adjusts the source gain G1 of the source device 100 and the sink gain G2 of the sink device 200 so that the output level of the media signal transmitted from the source device 100 to the sink device 200 via the media output-level control apparatus 300 can be properly adjusted into an ultimate output level desired by a user. The ultimate output level refers to an output level of media (e.g., video and/or audio) output from the sink device 200, which is determined by a combination of the source gain G1 of the source device 100 and the sink gain G2 of the sink device 200. In addition, the term "synchronously" in the disclosure is not intended to have a physically strict meaning.

Further, the media output-level control apparatus 300 generates an integrated UI for adjusting the ultimate output level corresponding to a combination of the source gain G1 and the sink gain G2, rather than separate UIs for respectively controlling the source gain G1 and the sink gain G2, thereby providing the integrated UI to the sink device 200.

A user 15 may use the remote controller 20 to set the ultimate output level through the integrated UI. The integrated UI is displayed with a scale of the ultimate output level corresponding to the combination of the source gain G1 and the sink gain G2. Therefore, unlike the conventional method, the user 15 can adjust the ultimate output level as desired by him/her synchronously through the integrated UI without respectively controlling the source gain G1 of the source device 100 and the sink gain G2 of the sink device 200. Further, the user 15 can precisely adjust the ultimate output level within a wider adjustment range through the integrated UI.

For example, as shown in FIG. 4, when the user 15 makes a user input to the sink device 200 by referring to the integrated UI, the media output-level control apparatus 300 receives the user input from the sink device 200, and synchronously transmits the control signals for adjusting both the source gain G1 and the sink gain G2 to the source device 100 and the sink device 200.

Thus, the media output-level control apparatus 300 calculates the source gain G1 and the sink gain G2 suitable for controlling the output levels of the media properties associated with the media source among various source devices 100 and various sink devices 200, and performs integrated control so that the source device 100 and the sink device 200 can be respectively controlled with the calculated gains. Alternatively, when the media output-level control apparatus 300 includes an integrated gain adjusting component, the source gain G1 of the media signal may be directly adjusted in the media output-level control apparatus 300 and then transmitted to the sink device 200 without transmitting the first control signal to the source device 100.

Figure 5:
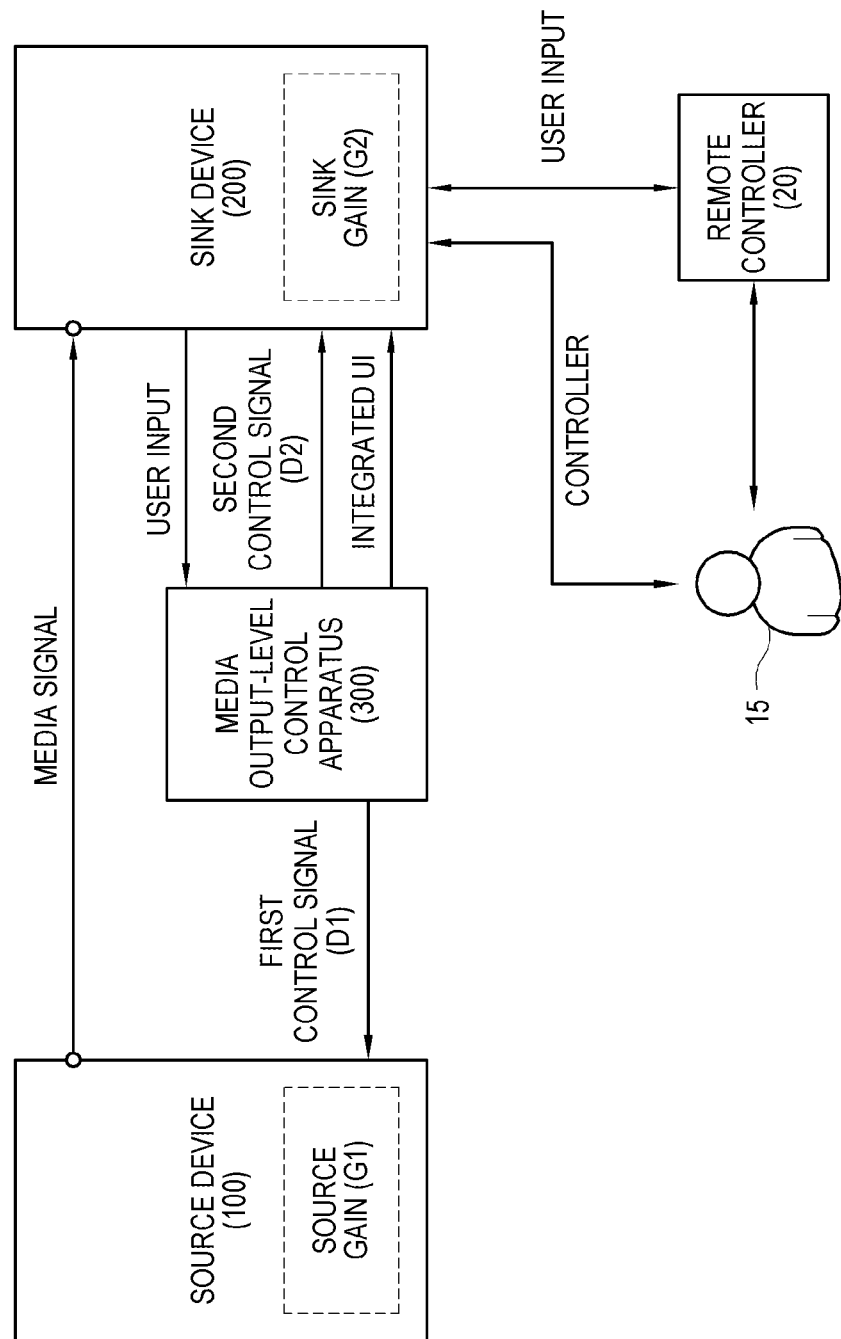

In FIG. 3 and FIG. 4, the media output-level control apparatus 300 has a function of switching a media signal between the source device 100 and the sink device 200, i.e., a media hub function, but is not limited thereto. As shown in FIG. 5, a media signal may be directly transmitted between the source device 100 and the sink device 200 without passing through a media output-level control apparatus 300. In this case, the media output-level control apparatus 300 transmits the first control signal and the second control signal to the source device 100 and the sink device 200, respectively, so as to adjust the ultimate output level.

Figure 6:
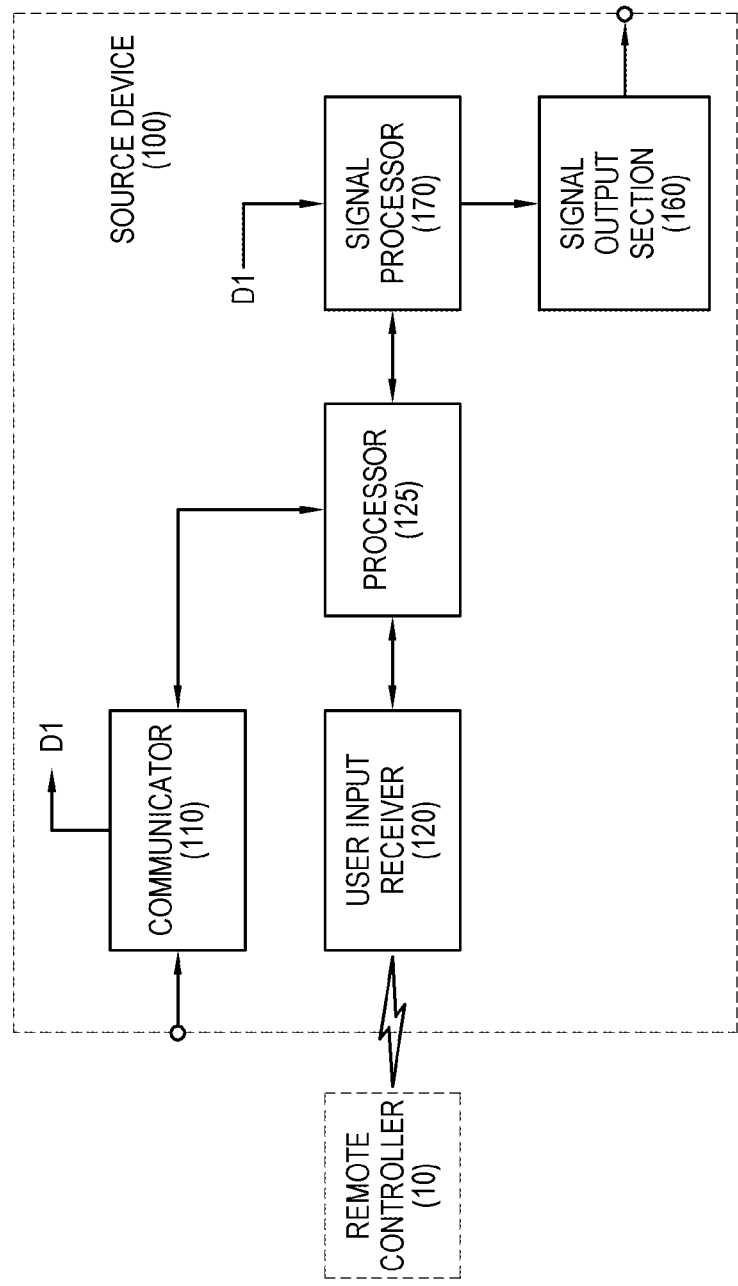
FIG. 6 is a block diagram of a source device according to an embodiment.

FIG. 6 is a block diagram of the source device 100 according to an embodiment. The source device 100 may include a communicator 110, a user input receiver 120, a processor 125, a signal processor 170, and a signal output section 160.

The processor 125 controls operations of elements in the source device 100. The processor 125 may for example include a central processing unit (CPU), a micro controller unit (MCU), a microcomputer (MICOM), an electronic control unit (ECU), an application processor (AP), and/or other electronic units capable of processing various computations and generating a control signal. The processor 125 may be designed to drive a previously defined application (or program or App), or perform various control operations in response to a user's control and setting using an input interface.

The user input receiver 120 may receive a remote-control code transmitted from a remote controller 10, and provides the remote-control code to the processor 125. In this case, the processor 125 controls elements of the source device 100 in response to the remote-control code. However, the remote control for providing a user input is merely an example. Alternatively, a mouse, a keyboard, voice recognition, gesture recognition, touch screen, and various other schemes may be used in providing a user input.

The communicator 110 may transmit or receive digital data in accordance with wireless or wired communication protocols corresponding to the communication standards of the home network 1. The communicator 110 is configured to communicate with at least one of internal devices of the home network 1 or external server apparatuses 2a, 2b and 2c on the basis of a wired/wireless communication network, and receive the media source from such devices and apparatuses. The communicator 110 for the wireless communication may be materialized by an antenna, a communication chip or board, or the like, capable of transmitting electromagnetic waves to the outside or receiving electromagnetic waves from the outside. The communicator 110 for the wired communication may be materialized by a physical cable such as a pairing cable, a coaxial cable, an optical fiber cable, an Ethernet cable, etc.

Further, the communicator 110 receives a first control signal including a source adjustment value (i.e., an adjustment value associated with the gain of the source device) D1 from the media output-level control apparatus 300 and provides the source adjustment value D1 to the signal processor 170, while transmitting the media properties supported in the source device to the media output-level control apparatus 300. To this end, the communicator 110 may use an extended function of a media transmission channel such as the HDMI-CEC, the IR-Blaster, etc., or use a public communication channel such as Ethernet, Wi-Fi, etc.

The source adjustment value D1 is a numerical value generated in the media output-level control apparatus 300 and indicates specific media properties transmitted as embedded in the first control signal, or a variation value of the numerical value. Further, the media properties refer to quantitative properties of media, which can be digitized, and include audio properties and video properties. For example, the audio properties include volume, treble boost, bass boost, reverb, voice amplification, sound field effect, etc., and the video properties include brightness, contrast, chroma, sharpness, deblock filtering, etc. The audio properties or the video properties can be digitized since they are quantitative values. However, the media properties are not limited to such audio properties or video properties, and may include other kinds of quantitative properties that can be sensed by a human's sensory organs and be digitizable, for example, tactility, vibration, pressure, temperature, etc.

The signal processor 170 may perform various data processes (e.g., media decoding, video filtering, audio filtering, etc.) with regard to the media source, for example, provided from the communicator 110. Such data processes may be omitted or simplified according to the kind of media source. Further, the signal processor 170 adjusts the source gain G1 associated with the provided media source on the basis of the provided source adjustment value D1. The source gain G1 refers to the level (or gain) of the output, which inheres in the media source when the restored media source is transmitted through the signal output section 160 or the communicator 110. Further, the source adjustment value D1 may indicate the source gain G1 desired by the media output-level control apparatus 300, or may be given as an index for indicating a variation value between the current source gain G1 and the desired source gain G1 to reach the desired source gain G1. FIG. 6 illustrates that the processor 125 and the signal processor 170 are provided as separate elements. Alternatively, the processor 125 and the signal processor 170 may be integrated into a single signal processor.

The signal output section 160 transmits the media source, the source gain G1 of which is adjusted by the signal processor 170, to the sink device 200 or the media output-level control apparatus 300 through a predetermined media transmission channel. In this case, the media source may be transmitted as encrypted according to digital transmission content protection (DTCP) standards.

The media transmission channel may, for example, include HDMI, digital visual interface (DVI), HDBaseT, DisplayPort, MHL, USB, component, composite, S-video, or the like, wired media transmission channels; and Miracast, wireless HD (WiHD), wireless home digital interface (WHDI), or the like, wireless media transmission channels. However, alternatively, the signal output section 160 may transmit the media source through the foregoing public communication channel supported in the communicator 110. In this case, the output of the signal processor 170 will be transmitted to the communicator 110.

Figure 7:
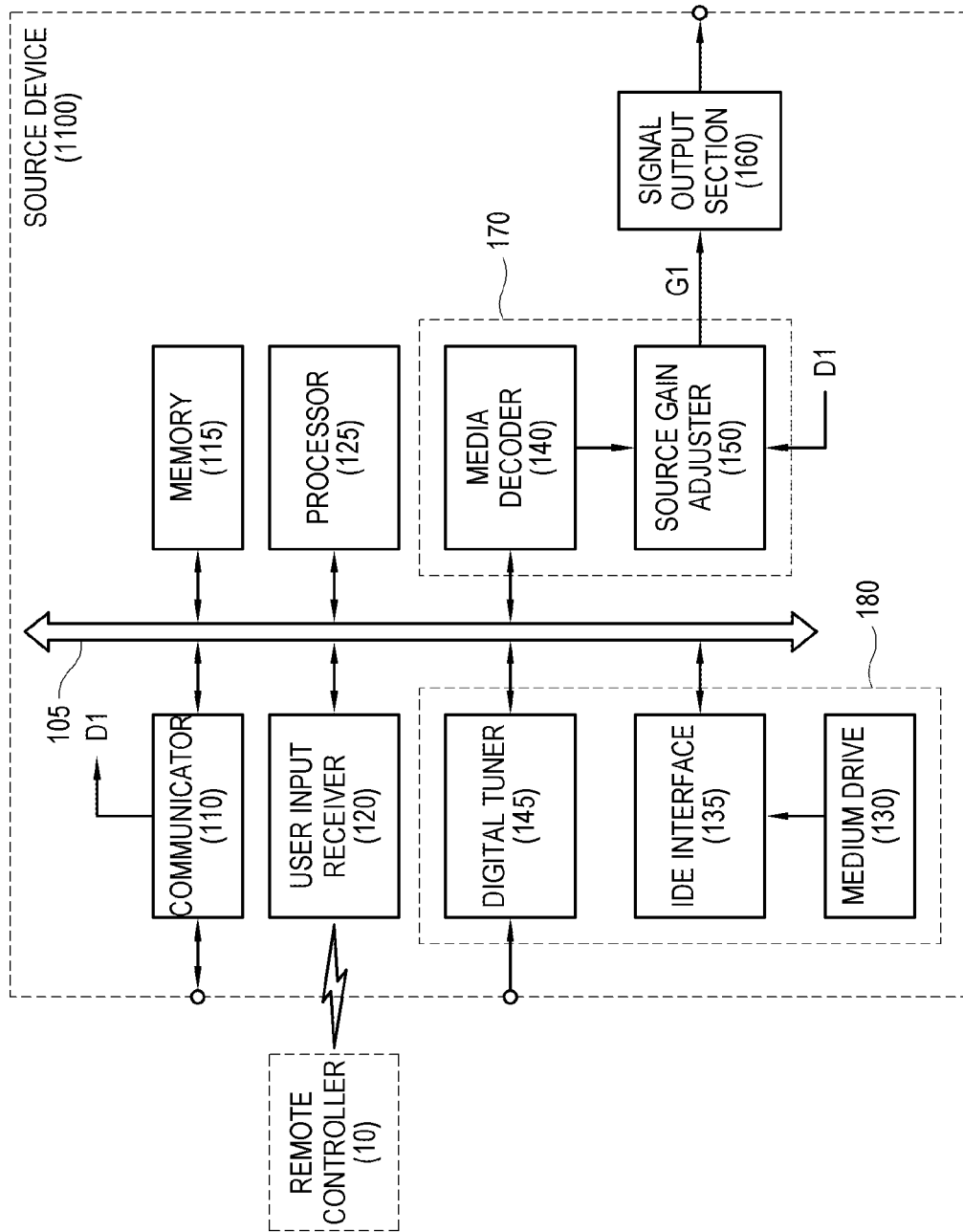
FIG. 7 is a block diagram of a source device according to an embodiment.

FIG. 7 is a block diagram of a source device 1100 according to an embodiment. Like the source device 100 shown in FIG. 6, the source device 1100 includes the communicator 110, the user input receiver 120, the processor 125, the signal processor 170, and the signal output section 160. Further, the source device 1100 may additionally include a system bus 105, a memory 115, and a media source provider 180. The processor 125, the memory 115, and the user input receiver 120 may be connected to the system bus 105. Likewise, an integrated development environment (IDE) interface 135, the communicator 110, and a media decoder 140 may be also connected to the system bus 105. Below, the source device 1100 will be described while focusing on differences from the source device 100 of FIG. 6 and avoiding repetitive descriptions.

The processor 125 serves to control operations of elements in the source device 1100, and the memory 115 serves to load control software and retain and store data. The memory 115 may for example include at least one of a main storage and an auxiliary storage. The main storage may be materialized by a semiconductor storage medium such as a read-only memory (ROM) and/or a random-access memory (RAM). The ROM may, for example, include a typical ROM, erasable and programmable read-only memory (EPROM), electrically erasable and programmable read-only memory (EEPROM), and/or a mask ROM. The auxiliary storage may be materialized by at least one storage medium such as a flash memory, a secure digital (SD) card, a solid-state drive (SSD), an HDD, a magnetic drum, or the like, capable of permanently or semi-permanently storing data.

The media source provider 180 provides a media source of various routes. The media source provider 180 may for example include a medium drive 130, a digital tuner 145, etc. However, alternatively, the media source may be provided in the form of a data packet through the communicator 110. The medium drive 130 reproduces media data from an optical disc as disc-recording media. The medium drive 130 may be connected to the system bus 105 through the IDE interface 135. Further, the digital tuner 145 processes a TV broadcasting signal received through an antenna terminal or a coaxial cable, outputs a predetermined transport stream (TS) corresponding to a user's selected channel, and demultiplexes the TS into a video packet and an audio packet corresponding to a user's selected channel.

Meanwhile, the signal processor 170 adjusts the source gain G1 associated with the provided media source on the basis of the source adjustment value D1 involved in the first control signal received from the media output-level control apparatus 300 through the communicator 110. The signal processor 170 may, for example, include the media decoder 140 and a source gain adjuster 150.

The media decoder 140 restores the media source by decoding a media stream provided from the media source provider 180 or the communicator 110 into video and audio data. Such a decoding process refers to a process for restoring compressed video and audio data into decompressed data, for example, in accordance with video compression standards such as moving picture experiment group (Mpeg)-2, Mpeg-4, H.264, high efficiency video coding (HEVC), etc. or audio compression standards such as MPEG layer-3 (MP3), advanced audio coding (AAC), audio Codec-3 (AC-3), digital theater system (DTS), free lossless audio codec (FLAC) Windows media audio (WMA), etc.

The source gain adjuster 150 adjusts the source gain G1 associated with the media source restored in the media decoder 140 on the basis of the provided source adjustment value D1. The source gain G1 refers to the level (or gain) of the output, which inheres in the media source when the restored media source is transmitted through the signal output section 160. Further, the source adjustment value D1 may indicate a particular source gain G1 desired by the media output-level control apparatus 300, or may be given as an index for indicating a variation value between the current source gain G1 and the desired source gain G1 to reach the desired source gain G1.

Figure 8:
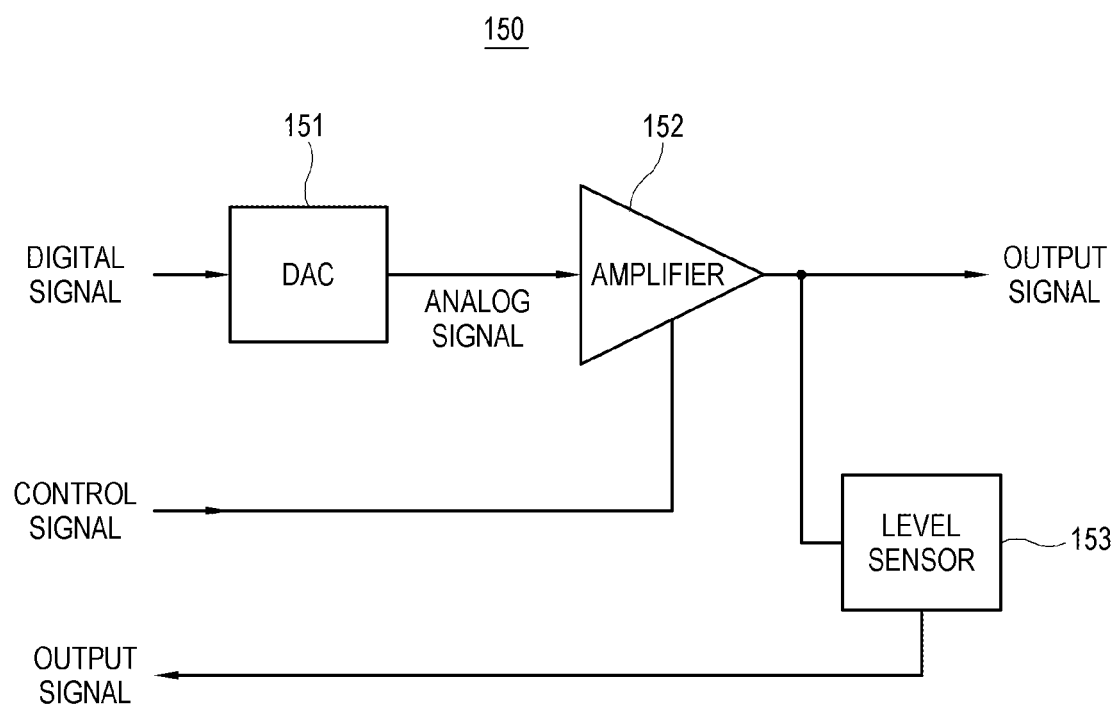
FIG. 8 is a block diagram of a source gain adjuster for adjusting a source gain according to an embodiment.

FIG. 8 is a block diagram of the source gain adjuster 150 for adjusting a source gain of a media source according to an embodiment. First, the media source restored in the media decoder 140, i.e., a digital signal input may be converted into an analog signal by a digital-analog converter (DAC) 151. The converted analog signal is input as an input signal to an amplifier 152, and a control signal for controlling an amplification level of the amplifier 152 is input as a control signal to the amplifier 152. The control signal may be determined based on the foregoing source adjustment value D1. For example, when the amplifier 152 is controlled by the control signal by 8 bits, the control signal may have levels of 0 to 255. The amplified analog signal is provided as the output signal amplified as much as the source gain G1, and output to the signal output section 160. The level of the amplified analog signal may be checked by a level sensor 153 and then fed back for more accurately setting the gain.

FIG. 8 illustrates that the DAC 151 is used in amplifying the analog signal, but the DAC 151 may be omitted when a digital signal is amplified. For example, among video signals, a signal transmitted as the DVI, HDMI, or the like, may be not subjected to the conversion of the DAC 151. Further, without performing the amplification shown in FIG. 8, the source gain adjuster 150 may adjust the source gain of the media source by a method of adjusting a source gain item of metadata involved in the digital media source.

Last, the media source, the source gain G1 of which is adjusted in the source gain adjuster 150, may be transmitted to the sink device 200 via the wired or wireless media transmission channel through the signal output section 160. Further, when the media output-level control apparatus 300 has the media hub function, the media source may be transmitted to the media output-level control apparatus 300.

Figure 9:
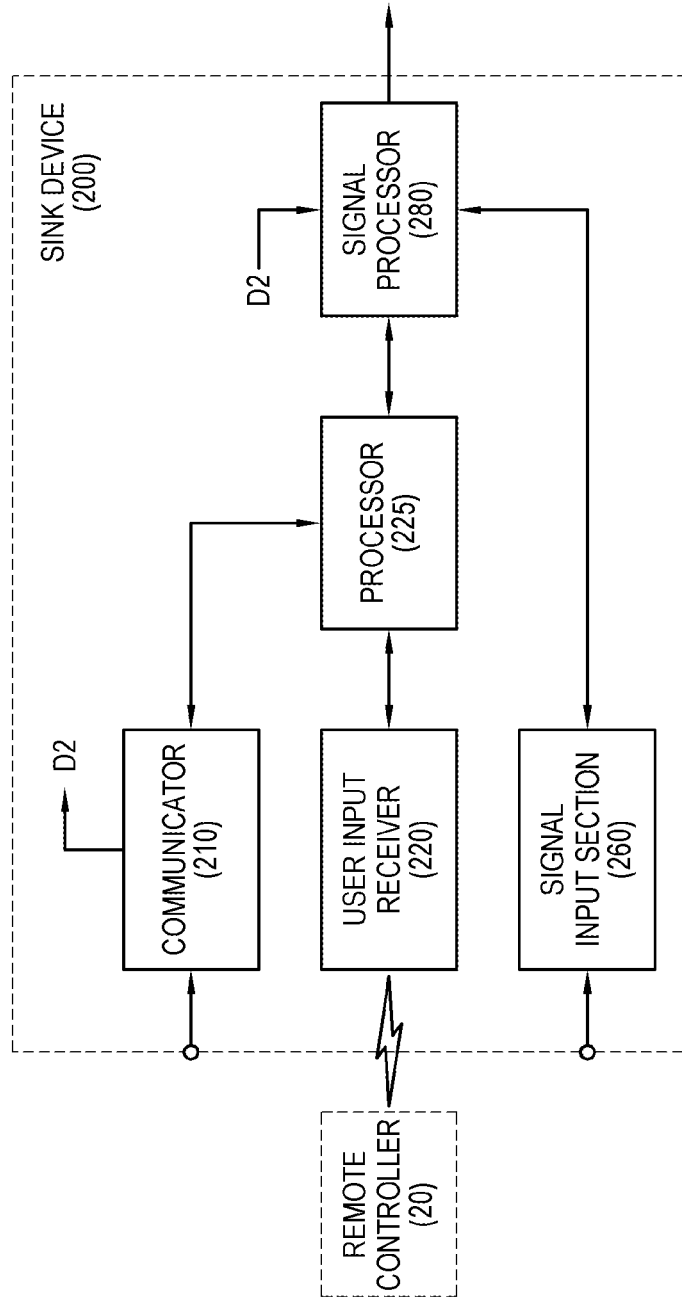
FIG. 9 is a block diagram of a sink device according to an embodiment.

FIG. 9 is a block diagram of a sink device 200 according to an embodiment. The sink device 200 may include a communicator 210, a user input receiver 220, a signal input section 260, a processor 225, and a signal processor 280.

The processor 225 controls operations of elements in the sink device 200. The processor 225 may for example include a CPU, a MCU, a MICOM, an ECU, an AP, and/or other electronic units capable of processing various computations and generating a control signal. The processor 225 may be designed to drive a previously defined application, or perform various control operations in response to a user's control and setting using an input interface.

The user input receiver 220 may receive a remote-control code transmitted from a remote controller 20, and provides the remote-control code to the processor 225. In this case, the processor 225 controls elements of the sink device 200 in response to the remote-control code. However, the remote control for providing a user input is merely an example. Alternatively, a mouse, a keyboard, voice recognition, gesture recognition, touch screen, and various other schemes may be used in providing a user input. The user may adjust the ultimate output level associated with specific media properties by controlling the remote controller 20. The ultimate output level refers to the output strength of the media in the sink device, which is determined based on a combination between the source gain G1 of the source device 100 and the sink gain G2 of the sink device 200 (e.g., G1*G2).

The media properties refer to quantitative properties of media, which can be digitized, and include audio properties and video properties. For example, the audio properties include volume, treble boost, bass boost, reverb, voice amplification, sound field effect, etc., and the video properties include brightness, contrast, chroma, sharpness, deblock filtering, etc. The audio properties or the video properties can be digitized since they are quantitative values.

The communicator 210 may transmit or receive digital data in accordance with wireless or wired communication protocols corresponding to the communication standards of the home network 1. The communicator 210 is configured to communicate with the source device 100 or the media output-level control apparatus 300 in the home network 1 on the basis of a wired/wireless communication network, and receive the media source from such devices. The communicator 210 for the wireless communication may be materialized by an antenna, a communication chip or board, or the like, capable of transmitting electromagnetic waves to the outside or receiving electromagnetic waves from the outside. The communicator 210 for the wired communication may be materialized by a physical cable such as a pairing cable, a coaxial cable, an optical fiber cable, an Ethernet cable, etc.

Further, the communicator 210 receives a first control signal including a sink adjustment value (i.e., an adjustment value associated with the gain of the sink device) D2 from the media output-level control apparatus 300 and transmits the sink adjustment value D2 to the signal processor 280, while transmitting the media properties supported in the sink device to the media output-level control apparatus 300. To this end, the communicator 210 may use a communication channel such as the HDMI-CEC, the IR-Blaster, etc., or use a public communication channel such as Ethernet, Wi-Fi, etc.

Further, the communicator 210 receives from the media output-level control apparatus 300 a user interface, in particular, a graphic user interface (GUI, or integrated UI) for allowing the user to adjust the ultimate output level of the sink device 200. However, alternatively, the communicator 210 may receive information associated with the media properties from the source device 100, and directly generate the user interface in the sink device 200.

The user interface (or the integrated UI) received in the communicator 210 may be displayed on the display panel. Through the user interface, a user may input a desired ultimate output level while using the remote controller 20. Detailed descriptions associated with such a user interface will be made later with reference to FIG. 18.

The signal input section 260 receives a media source from the source device 100 through a predetermined media transmission channel. Alternatively, when the media output-level control apparatus 300 functions as a media hub, the media source may be received from the media output-level control apparatus 300. In this case, when the received media source is encrypted according to the DTCP standards, the signal input section 260 may additionally decrypt the media source according to the DTCP standards.

The media transmission channel may for example include HDMI, DVI, HDBaseT, DisplayPort, MHL, USB, component, composite, S-video, or the like; and Miracast, WiHD, WHDI, or the like. However, alternatively, the signal input section 260 may receive the media source through the foregoing public communication channel supported in the communicator 210. In this case, the input of the signal input section 260 will be provided from the communicator 210.

The signal processor 280 adjusts the sink gain G2 associated with the media properties of the media source provided from the signal input section 260. In this case, a sink gain adjuster 250 adjusts the sink gain G2 in accordance with the sink gain adjustment value D2 provided from the media output-level control apparatus 300 through the communicator 210. FIG. 9 illustrates that the processor 225 and the signal processor 280 are provided as separate elements. Alternatively, the processor 225 and the signal processor 280 may be integrated into a single signal processor.

The sink gain G2 refers to a gain value additionally amplified in the media source before the media source having the source gain G1 is output through the display panel, the loudspeaker, or the like. Further, the sink adjustment value D2 may indicate a particular sink gain G2 desired in the media output-level control apparatus 300, or may be given as a variation value between the current sink gain G2 and the desired sink gain G2 to reach the desired sink gain G2.

Although the sink device 200 itself adjusts only the sink gain G2, the source media, of which the source gain G1 of the source device 100 has already been adjusted, may be provided to the sink device 200, and therefore the ultimate output level may be adjustable based on a combination of two gains G1 and G2.

For example, the signal processor 280 may adjust the sink gain by the foregoing method of FIG. 8. First, the media source restored in a media decoder 240 or the digital signal input associated with the media source having the source gain G1 provided from the signal input section 260 may be converted into an analog signal input via the DAC 151 or may not pass the DAC 151. The digital signal input or the analog signal input is input as the input signal to the amplifier 152, and a signal for controlling an amplification level of the amplifier 152 may be input as a control signal to the amplifier 152. Such a control signal is determined based on the foregoing sink adjustment value D2. Such an amplified analog signal may be output to the outside of the sink device 200 as an output signal amplified as much as the sink gain G2.

Eventually, the signal processor 280 controls the output strength of the media output from the sink device 200, i.e., the sink gain G2 for outputting the ultimate output level based on a combination between the source gain G1 of the source device 100 and the sink gain G2 of the sink device 200. The ultimate output level L may be defined as a function of the source gain G1 and the sink gain G2 as shown in the following Expression 1.

$$L = f(G1, G2) \quad \text{[Expression 1]}$$

When the ultimate output level L is a linear function of input gains, it may be defined as the product of two gains (e.g., G1*G2). However, without limitations, when there is a need of detailed adjustment of media properties in a specific range rather than even adjustment throughout a full dynamic range, the ultimate output level L may be defined as various nonlinear functions with inputs of the source gain G1 and the sink gain G2. The sink gain G2 adjusted in the signal processor 280 influences the output strength of a displayed image or an output sound in the sink device 200.

Figure 10:
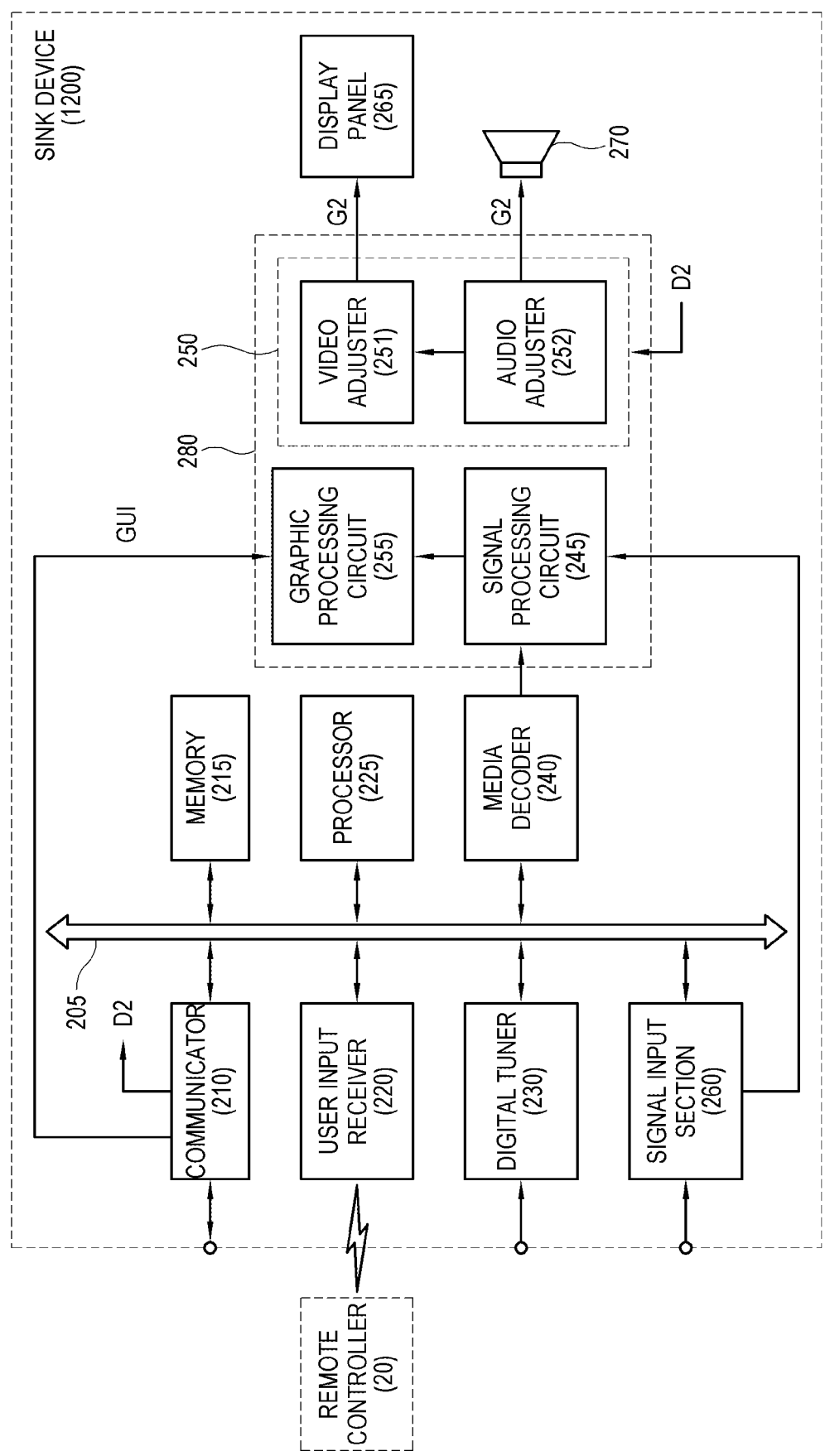
FIG. 10 is a block diagram of a sink device according to an embodiment.

FIG. 10 is a block diagram of a sink device 1200 according to an embodiment. Like the sink device 200 shown in FIG. 9, the sink device 1200 includes the communicator 210, the user input receiver 220, the processor 225, the signal processor 280, and the signal input section 260. Further, the sink device 1200 may additionally include a system bus 205, a memory 215, a digital tuner 230, a display panel 265, and a loudspeaker 270. However, when the sink device 1200 supports only one of image output and sound output, either of the display panel 265 or the loudspeaker 270 may be omitted. The processor 225, the memory 215, and the user input receiver 220 may be connected to the system bus 205. Likewise, the communicator 210, the media decoder 240, the digital tuner 230, and the signal input section 260 may be also connected to the system bus 205. Below, the sink device 1200 will be described while focusing on differences from the sink device 200 of FIG. 9 and avoiding repetitive descriptions.

The processor 225 serves to control operations of elements in the sink device 1200, and the memory 215 serves to load control software and retain and store data. The memory 215 may, for example, include at least one of a main storage and an auxiliary storage. The main storage may be materialized by a semiconductor storage medium such as a ROM and/or a RAM. The ROM may for example include a typical ROM, EPROM, EEPROM, and/or a mask ROM. The auxiliary storage may be materialized by at least one storage medium such as a flash memory, an SD card, an SSD, an HDD, a magnetic drum, and the like capable of permanently or semi-permanently storing data.

The digital tuner 230 processes a TV broadcasting signal received through an antenna terminal or a coaxial cable, outputs a predetermined transport stream (TS) corresponding to a user's selected channel, and demultiplexes the TS into a video packet and an audio packet corresponding to a user's selected channel.

The media decoder 240 obtains video data by decoding a video packetized elementary stream (PES) packet configured with a TS packet of image data obtained from the digital tuner 230. Further, the media decoder 240 obtains audio data by decoding an audio PES packet configured with a TS packet of audio data obtained from the digital tuner 230.

However, the digital tuner 230 and the media decoder 240 may be removed when the sink device 1200 does not have a broadcast receiving function or a media playback function.

The signal processor 280 adjusts the sink gain G2 of the provided media source in accordance with the provided sink adjustment value D2. The signal processor 280 may for example include a graphic processing circuit 255, a signal processing circuit 245, and a sink gain adjuster 250.

The signal processing circuit 245 and the graphic processing circuit 255 perform a scaling process (or a resolution conversion process), various image filtering processes, etc. as necessary with regard to video data obtained in the media decoder 240 or video data received in the signal input section 260. Further, the signal processing circuit 245 may perform up/down mixing, white-noise removal, various audio filtering and the like processes with regard to audio data obtained in the media decoder 240 or audio data received in the signal input section 260.

The video data processed in the graphic processing circuit 255 may be adjusted in the sink gain G2 associated with video media properties through a video adjuster 251. Likewise, the audio data processed in the signal processing circuit 245 may be adjusted in the sink gain G2 associated with audio media properties through an audio adjuster 252. Eventually, the sink gain adjuster 250 adjusts the sink gain G2 associated with the media source in accordance with the sink gain adjustment value D2 provided from the media output-level control apparatus 300 to the communicator 210. The sink gain G2 refers to a gain value additionally amplified in the media source before the media source having the source gain G1 is output through the display panel 265 or the loudspeaker 270. Further, the sink adjustment value D2 may indicate a particular sink gain G2 desired in the media output-level control apparatus 300, or may be given as an index for indicating a variation value between the current sink gain and the desired sink gain G2 to reach the desired sink gain G2.

Although the sink device 200 itself adjusts only the sink gain G2, the source media, of which the source gain G1 of the source device 100 has already been adjusted, may be provided to the sink device 200, and therefore the ultimate output level may be adjustable based on a combination of two gains G1 and G2.

The image adjusted in the sink gain G2 may be output to the display panel 265, and the sound adjusted in the sink gain G2 may be output to the loudspeaker 270.

The display panel 265 may, for example, be materialized by a liquid crystal display (LCD), a plasma display panel (PDP), etc. For example, the display panel 265 may include an LCD panel using liquid crystal, a display panel using a light emitting diode (LED) emitting light independently, a display panel using an organic light emitting diode (OLED) or an active matrix organic light emitting diode (AMOLED), or a quantum dot (QD) display panel. The display panel 265 may include a rigid display panel or a flexible display panel according to embodiments.

Further, the loudspeaker 270 may include a passive or active loudspeaker, or may include a directional or omnidirectional loudspeaker. In addition, the loudspeaker 270 may support the same number of channels as the number of signal channels. However, when the sink device 1200 supports only one of image output and sound output, either of the display panel 265 or the loudspeaker 270 may be removed.

Figure 11:
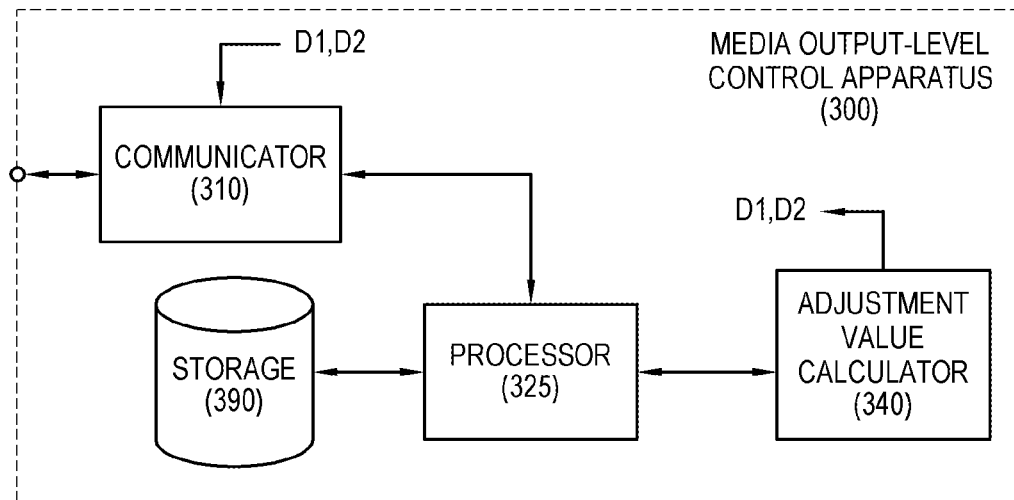
FIG. 11 is a block diagram of a media output-level control apparatus according to an embodiment.

FIG. 11 is a block diagram of a media output-level control apparatus 300 according to an embodiment. The media output-level control apparatus 300 is connected to each of the source device 100 for reproducing the media and the sink device 200 for outputting the reproduced media to a user, and is capable of controlling both the source gain G1 associated with the media properties supported in the source device 100 and the sink gain G2 associated with the media properties supported in the sink device 200.

According to an embodiment, the media output-level control apparatus 300 may include a communicator 310, a processor 325, and an adjustment value calculator 340, and may further include a storage 390.

The processor 325 controls operations of elements in the media output-level control apparatus 300. The processor 325 may for example include a CPU, a MCU, a MICOM, an ECU, an AP, and/or other electronic units capable of processing various computations and generating a control signal. The processor 325 may be designed to drive a previously defined application, or perform various control operations in response to a user's control and settings using an input interface.

The communicator 310 may transmit or receive digital data in accordance with wireless or wired communication protocols corresponding to the standards of the home network 1. The communicator 310 is configured to communicate with the source device 100 and the sink device 200 in the home network 1 on the basis of a wired/wireless communication network, and receive the media source from such devices. The communicator 310 for the wireless communication may be materialized by an antenna, a communication chip or board, or the like capable of transmitting electromagnetic waves to the outside or receiving electromagnetic waves from the outside. The communicator 310 for the wired communication may be materialized by a physical cable such as a pairing cable, a coaxial cable, an optical fiber cable, an Ethernet cable, etc.

To this end, the communicator 310 may use a communication channel such as the HDMI-CEC, the IR-Blaster, etc., or use a public communication channel such as Ethernet, Wi-Fi, etc. The media properties refer to quantitative properties of media, which can be digitized, and include audio properties and video properties. Here, the audio properties include volume, treble boost, bass boost, reverb, voice amplification, sound field effect, etc., and the video properties include brightness, contrast, chroma, sharpness, deblock filtering, etc. The audio properties or the video properties can be digitized since they are quantitative values.

The storage 390 is configured to store the current source gain of the source device 100 and the current source gain of the sink device 200, and provide them to the adjustment value calculator 340. The current source gain and the current sink gain may be provided from the source device 100 and the sink device 200 through the communicator 310, but are not limited thereto. Alternatively, the source gain and the sink gain, which are updated with the source adjustment value and the sink adjustment value calculated by the adjustment value calculator 340 to be described later, may be stored in the storage 390. The storage may be materialized by at least one storage medium, in which data is temporarily or semi-permanently stored, such as a ROM, a RAM, a flash memory, an SD card, an SDD, an HDD, a magnetic drum, etc.

The adjustment value calculator 340 calculates the source adjustment value D1 for changing the source gain G1 and the sink adjustment value D2 for changing the sink gain G2 in response to the user input signal. The adjustment value calculator 340 may determine the ultimate output level L of the media source to be output in the sink device 200 on the basis of a combination of the calculated source adjustment value D1 and the calculated sink adjustment value D2. In this case, the adjustment value calculator 340 may use a mapping table where a correlation between the ultimate output level L and the source and sink gains G1 and G1 is tabulated as shown in the foregoing Expression 1. The media output-level control apparatus 300 may receive the mapping table showing the correlation from the sink device 200 since an actual mapping condition, under which the sink device 200 outputs an image or sound through the display panel, the loudspeaker or the like, has to be also directly reflected in the adjustment value calculator 340. However, alternatively, when a mapping function such as the Equation 1 has been previously defined and shared between the sink device 200 and the media output-level control apparatus 300, the media output-level control apparatus 300 may not receive the mapping table.

The source adjustment value D1 and the sink adjustment value D2 calculated by the adjustment value calculator 340 are respectively embedded in the first control signal and the second control signal and transmitted through the communicator 310. Then, the source device 100 adjusts the source gain G1 based on the first control signal, and the sink device 200 adjusts the sink gain G2 based on the second control signal. Eventually, the ultimate output level of the media output in the sink device 200 is controlled by a combination between the adjusted source gain G1 and the adjusted sink gain G2. FIG. 11 illustrates that the processor 325 and the adjustment value calculator 340 are provided as separate elements. Alternatively, the functions of the adjustment value calculator 340 may be integrated into the processor 325.

The storage 390 is configured to store the latest update values (or current values) of the source gain G1 changed by the source adjustment value D1 and the sink gain G2 changed by the sink adjustment value D2. Therefore, the media output-level control apparatus 300 can grasp the current source gain G1 of the source device 100 and the current sink gain G2 of the sink device 200 in real time.

As described above, when a plurality of users are between the plurality of source devices 100 and the plurality of sink devices 200 and there is a request for changing various media properties between the plurality of source devices 100 and the plurality of sink devices 200, the adjustment value calculator 340 may control the ultimate output level L to solve interference or collision problems caused in this case. For example, under a condition that a plurality of users who employ a plurality of sink devices 200 is with respect to one source device 100, when a first user changes the media properties and thus the source gain G1 of the source device 100 is also changed, a second user experiences inconvenience that since the ultimate output level is changed. Of course, such a problem does not arise when the first user changes only the sink gain G2 of the corresponding sink device 200 without changing the source gain G1 of the source device 100. In another way, however, a problem arises in that a range where the first user changes the media properties is narrow.

Therefore, according to an embodiment, when a user input signal of the first sink device is input for changing the ultimate output level L of the first sink device while the source device 100 is being used by the user of the second sink device in an environment where one source device 100 and the plurality of sink devices 200 are present, there is a need of synchronously changing both the source gain G1 of the source device 100 and the sink gain G2 of the second sink device. Here, the adjustment value calculator 340 may calculate both the source adjustment value D1 of the source device 100 and the sink adjustment value D2 of the second sink device so as to minimize a variation value of the ultimate output level of the second sink device according to a combination of the source gain G1 and the sink gain G2.

According to an alternative embodiment, it is preferable to maintain the existing ultimate output level of the first sink device while adjusting the source gain G1 of the second source device and the sink gain G2 of the first sink device even though the first sink device is switched over from connection with the first source device to connection with the second source device in an environment where the plurality of source devices 100 and the plurality of sink device 200 are present. However, if the second source device is being used by the user of the second sink device during the switching, it is inconvenient for the user of the second sink device to discretionally change the source gain of the second source device. Therefore, there is a need of changing both the source gain G1 of the second source device and the sink gain G2 of the second sink device. In this case, the adjustment value calculator 340 may calculate both the source adjustment value D1 of the second source device and the sink adjustment value D2 of the second sink device while minimizing the variation value in the ultimate output level of the second sink device based on the combination between the source gain G1 of the second source device and the sink gain G2 of the second sink device. Further, the adjustment value calculator 340 may also calculate an output adjustment value D2 of the sink gain G2 of the first sink device so as to minimize a variation value in an ultimate sink gain of the first sink device during the switching, based on the changed source gain G1.

Figure 12:
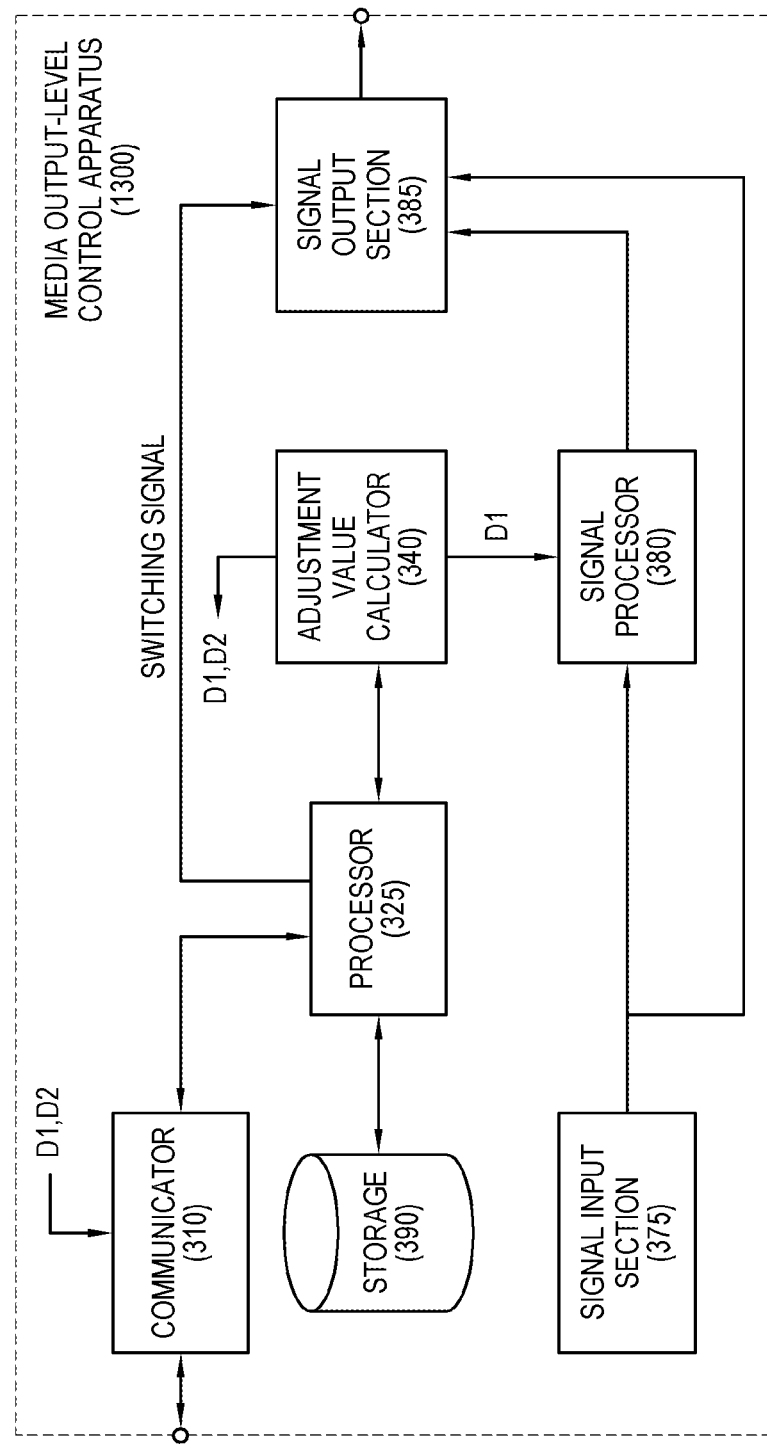
FIG. 12 is a block diagram of a media output-level control apparatus according to an embodiment.

FIG. 12 is a block diagram of a media output-level control apparatus 1300 according to an embodiment. The media output-level control apparatus 1300 additionally has a media hub function as compared with the media output-level control apparatus 300 of FIG. 11. Therefore, the media output-level control apparatus 1300 further has a function of relaying a media signal between the source devices 100, 1100 and the sink devices 200, 1200.

The configurations and operations of the communicator 310, the storage 390, the processor 325, and the adjustment value calculator 340 are similar to those of the media output-level control apparatus 300 shown in FIG. 11, and thus the media output-level control apparatus 1300 will be described while avoiding repetitive descriptions.

The media output-level control apparatus 1300 may further include a signal input section 375 for receiving a media signal output from the source device 100, and a signal output section 385 for transmitting the received media signal to the sink device 200.

The signal input section 375 receives the media source from the source device 100 through a predetermined media transmission channel. The media transmission channel may, for example, inclusively include HDMI, DVI, HDBaseT, DisplayPort, MHL, USB, component, composite, S-video, or the like; and Miracast, WiHD, WHDI, or the like. However, alternatively, the signal input section 375 may receive the media source through the foregoing public communication channel supported in the communicator 310. In this case, the input of the signal input section 375 will be provided from the communicator 310.

The signal output section 385 transmits the media source from the signal input section 375 to the sink device 200 through the media transmission channel. In this case, the received media source may be transmitted as encrypted according to the DTCP standards. Further, the signal output section 385 may switch the media source over to the output channel for the corresponding sink device 200 in response to a switching signal provided from the processor 325. The switching signal is a control signal for connecting the source device 100, with which the sink device 200 makes a request for connecting, and the sink device 200 by the corresponding output channel. Such a switching function is one function of a media hub, by which variable connection between the plurality of source devices 100 and the plurality of sink devices 200 is possible.

In this way, the media output-level control apparatus 1300 may function as the media hub for transmitting the media source from the source device 100 to the sink device 200. However, alternatively, the media output-level control apparatus 1300 may directly change the source gain of the received media source and then transmit it to the sink device 200.

To this end, the media output-level control apparatus 1300 may further include a signal processor 380, and the signal processor 380 may adjust the gain of the received media source based on the source adjustment value D1 calculated in the adjustment value calculator 340. In this case, the gain adjustment of the signal processor 380 may be performed by a gain adjustment circuit as illustrated above in FIG. 8.

Thus, the gain adjustment may be achieved in all of the source device 100, the media output-level control apparatus 1300, and the sink device 200. However, alternatively, the media output-level control apparatus 1300 may be configured to directly adjust the source gain G1, and the sink device 200 may be configured to directly adjust the sink gain G2. In this case, the first control signal involving the source adjustment value D1 calculated by the adjustment value calculator 340 may be not transmitted to the source device 100.

Figure 13:
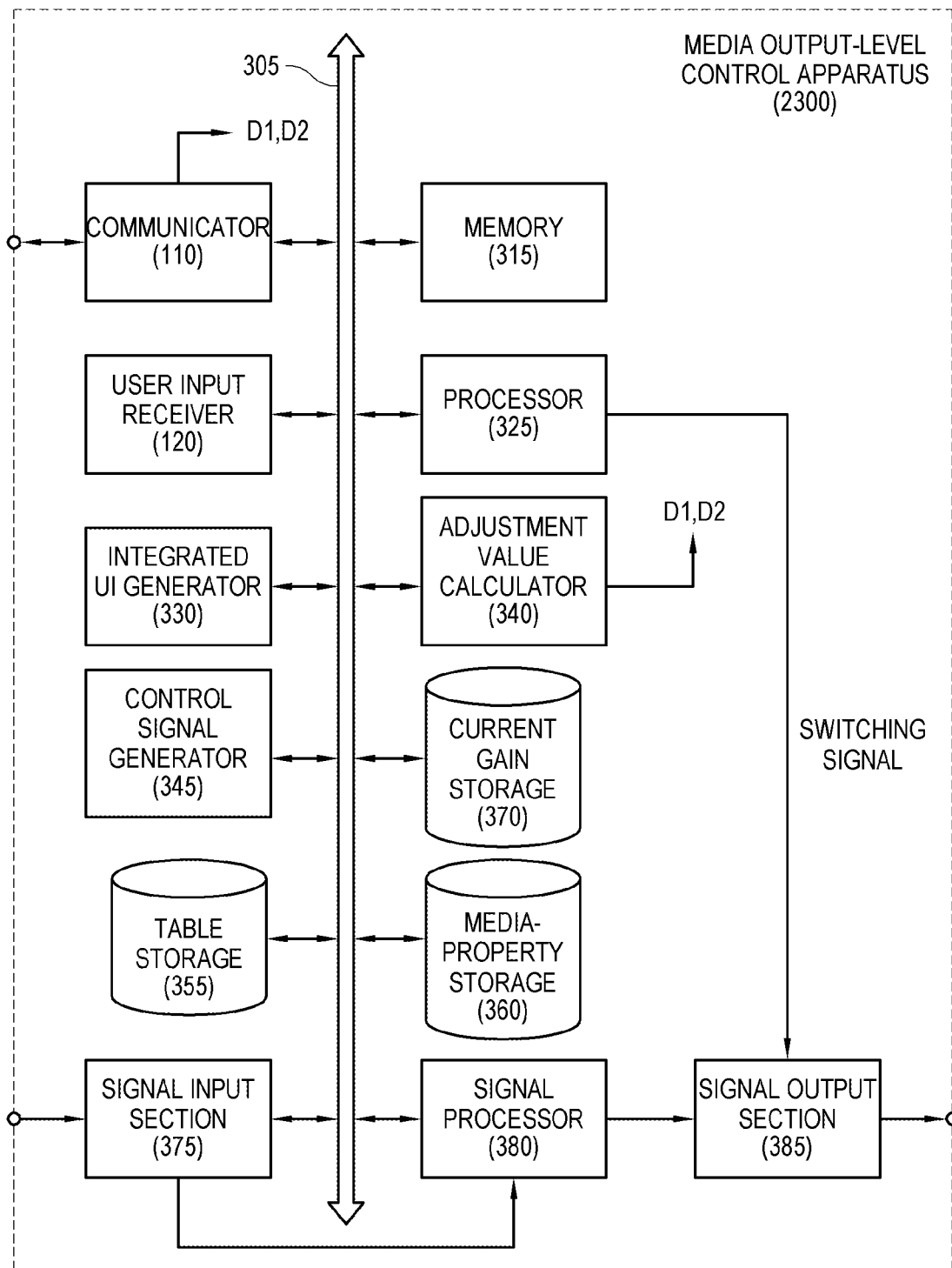
FIG. 13 is a block diagram of a media output-level control apparatus according to an embodiment.

FIG. 13 is a block diagram of a media output-level control apparatus 2300 according to an embodiment. The media output-level control apparatus 2300 may include the communicator 310, the storage 390, the processor 325, the adjustment value calculator 340, the signal processor 380, the signal input section 375, and the signal output section 385, similar to the media-output level control apparatus 1300 shown in FIG. 12. Further, the media output-level control apparatus 2300 may additionally include a system bus 305, a memory 315, a user input receiver 320, an integrated UI generator 330, and a control signal generator 345. Further, the storage 390 may include a current gain storage 370, a media-property storage 360, and a table storage 355.

The processor 325, the memory 315, the communicator 310, and the user input receiver 320 may be connected to the system bus 305. Likewise, the integrated UI generator 330, the control signal generator 345, the adjustment value calculator 340, the signal input section 375, the signal processor 380, and various storages 355, 360 and 370 may be also connected to the system bus 305. Below, the media output-level control apparatus 2300 will be described while focusing on differences from the media output-level control apparatus 1300 of FIG. 12 and avoiding repetitive descriptions.

The processor 325 serves to control operations of elements in the media output-level control apparatus 2300, and the memory 315 serves to load control software and retain and store data. The memory 315 may for example include at least one of a main storage and an auxiliary storage. The main storage may be materialized by a semiconductor storage medium such as a ROM and/or a RAM. The ROM may for example include a typical ROM, an EPROM, an EEPROM, and/or a mask ROM. The auxiliary storage may be materialized by at least one storage medium such as a flash memory, an SD card, an SSD, an HDD, a magnetic drum, and the like capable of permanently or semi-permanently storing data.

The user input receiver 320 receives a user input received in the sink device 200 through the communicator 310. The user input involves the ultimate output level associated with specific media properties desired by a user in the sink device 200. The ultimate output level refers to the output strength of the media output in the sink device 200, which is determined based on a combination between the source gain G1 of the source device 100 and the sink gain G2 of the sink device 200. Meanwhile, according to an embodiment, the user input receiver 320 may directly receive the ultimate output level from a user through a control means such as a remote controller, etc. instead of receiving the user input from the sink device 200.

The adjustment value calculator 340 calculates the source adjustment value D1 for changing the source gain G1 and the sink adjustment value D2 for changing the sink gain G2 in response to the user input signal. The adjustment value calculator 340 may determine the ultimate output level L of the media source to be output in the sink device 200 on the basis of a combination of the calculated source adjustment value D1 and sink adjustment value D2. In this case, the adjustment value calculator 340 may use a mapping table where a correlation between the ultimate output level L and the source and sink gains G1 and G2 is tabulated as shown in the foregoing Expression 1. The mapping table may be provided by the sink device 200 and stored in the table storage 355.

The current gain storage 370 is configured to store the latest update values (or current values) of the source gain G1 changed by the source adjustment value D1 and the sink gain G2 changed by the sink adjustment value D2. Therefore, the media output-level control apparatus 2300 can determine the current sink gain G1 of the source device 100 and the current sink gain G2 of the sink device 200 in real time.

Further, the media-property storage 360 is configured to store first media properties supported in the source device 100 and second media properties supported in the sink device 200. Since the source device 100 and the sink device 200 may be different in supporting media properties, the media output-level control apparatus 2300 has to be informed of the media properties controllable in both devices 100 and 200. The media properties may include audio properties such as volume, treble boost, bass boost, reverb, voice amplification, sound field effect, etc., and video properties such as brightness, contrast, chroma, sharpness, deblock filtering, etc., which are quantifiable and controllable. For example, when the volume properties are supported in both the devices 100 and 200, the media output-level control apparatus 2300 may control the source gain G1 and the sink gain G2 with regard to the volume properties. Alternatively, when the voice amplification properties are supported in only the source device 100, only the source gain G1 is controllable with regard to the voice amplification properties. Eventually, when both the source gain G1 and the sink gain G2 are controllable with respect to certain media properties, it means that the first media properties supported in the source device 100 and the second media properties supported in the sink device 200 have the certain media properties in common with each other.

The control signal generator 345 generates the first control signal to make a request for changing the source gain G1 based on the source adjustment value D1 calculated in the adjustment value calculator 340, and generates the second control signal to make a request for changing the sink gain G2 based on the sink adjustment value D2 calculated in the adjustment value calculator 340. Then, the communicator 310 transmits the first control signal to the source device 100, and transmits the second control signal to the sink device 200.

Meanwhile, the integrated UI generator 330 generates a user interface, in particular, an integrated GUI for allowing the user of the sink device 200 to adjust the ultimate output level of the sink device 200. Detailed descriptions associated with such a GUI will be made later with reference to FIG. 18. In a case where the integrated UI is capable of being directly generated in the sink device 200, the integrated UI generator 330 may be removed.

Meanwhile, the media output-level control apparatus 2300 having a media hub function may further include the signal input section 375 for receiving a media signal output from the source device 100, and the signal output section 385 for transmitting the received media signal to the sink device 200.

The signal input section 375 receives the media source from the source device 100 through a predetermined media transmission channel. Further, the signal output section 385 transmits the media source from the signal input section 375 to the sink device 200 through the media transmission channel. In this case, the signal output section 385 may switch the media source over to the output channel for the corresponding sink device 200 in response to a switching signal provided from the processor 325.

Meanwhile, the media output-level control apparatus 2300 may further include the signal processor 380, and the signal processor 380 may additional adjust the gain of the received media source based on the source adjustment value D1 calculated in the adjustment value calculator 340.

Figure 14:
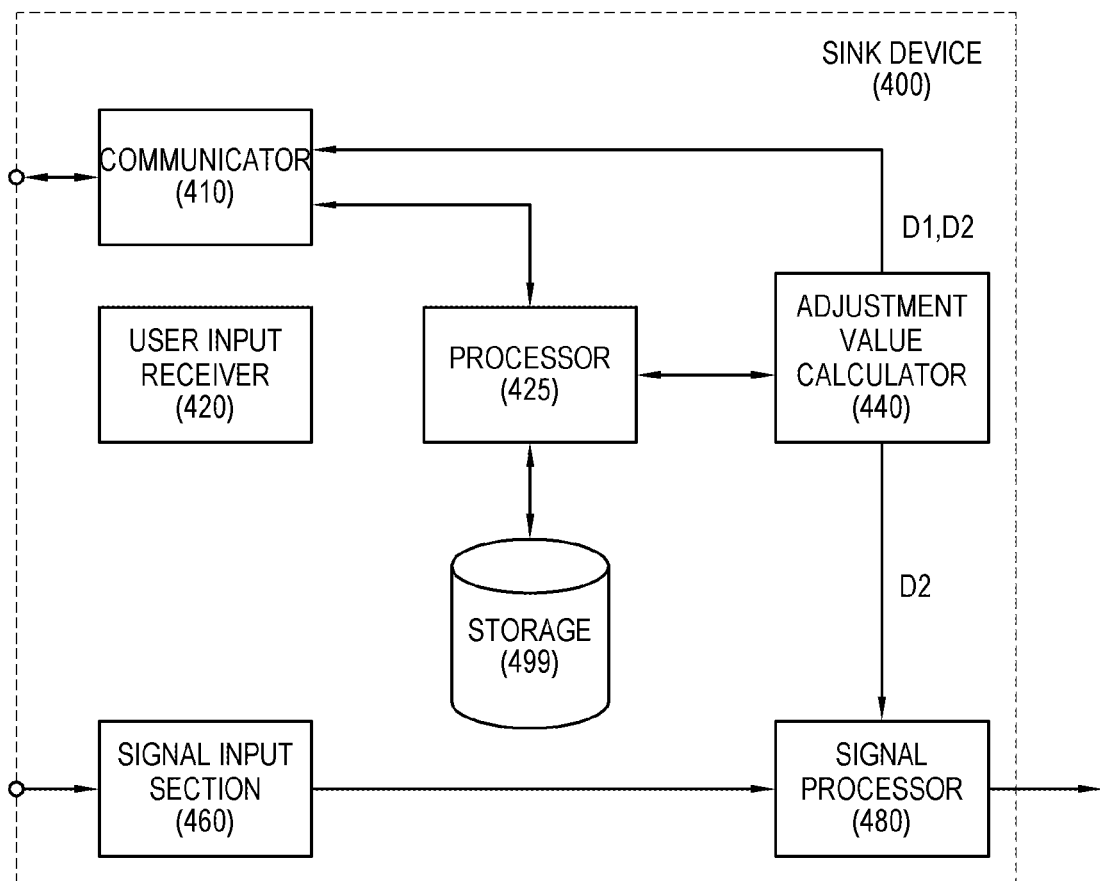
FIG. 14 is a block diagram of a sink device having a function of a media output-level control apparatus according to an embodiment.

FIG. 14 is a block diagram of a sink device 400 according to an embodiment. The sink device 400 of FIG. 14 shows an embodiment where the sink device 200 of FIG. 9 has the function of the media output-level control apparatus 300 of FIG. 11. Therefore, the sink device 400 will be described while focusing differences from those of FIGS. 9 and 11 and avoiding repetitive descriptions.

The sink device 400 includes a communicator 410, a user input receiver 420, a signal input section 460, a processor 425, and a signal processor 480, which are respectively equivalent to the communicator 210, the user input receiver 220, the signal input section 260, the processor 225 and the signal processor 280 of the sink device 200 shown in FIG. 9. Further, the adjustment value calculator 440 and the storage 499 of the sink device 400 are equivalent to the adjustment value calculator 340 and the storage 390 of the media output-level control apparatus 300 shown in FIG. 11.

The user input receiver 420 receives a user input signal for changing the ultimate output level of the sink device 400.

The adjustment value calculator 440 calculates the source gain G1 and the sink gain G2 for achieving the ultimate output level L in response to the user input signal, and calculates the source adjustment value D1 and the sink adjustment value D2 by which the current source gain G1 and the current sink gain G2 will be adjusted. Then, the communicator 410 transmits the first control signal to the source device 100, thereby controlling the source device 100 to change the source gain G1 of the media source as much as the source adjustment value D1. The current source gain G1 and the current sink gain G2 may be provided as stored in the storage 499, and may be stored as updated with the latest values when they are changed.

For example, when a user input signal is input for changing the ultimate output level of the sink device 400 while the source device 100 is being used by a different sink device 200, there is a need of changing both the source gain G1 of the source device 100 and the sink gain G2 of the different sink device 200 so as not to inconvenience the user of the different sink device 200. In this case, the adjustment value calculator 440 may calculate both the source adjustment value D1 for the source gain G1 of the source device 100 and the sink adjustment value D2 for the sink gain G2 of the different sink device 200 so that a variation value for the ultimate output level of the different sink device 200 can be minimized corresponding to a combination between the source gain G1 of the source device 100 and the sink gain G2 of the different sink device 200.

Alternatively, in a case where the plurality of source devices (e.g., a first source device and a second source device) are and the sink device 400 is switched over from connection with the first source device to connection with the second source device, there is a need of changing both the source gain G1 of the second source device and the sink gain G2 of the second sink device when the second source device is being used by the sink device 200. Here, the adjustment value calculator 440 may calculate both the source adjustment value D1 of the second source device and the sink adjustment value D2 of the different sink device 200, so that a variation value for the ultimate output level of the different sink device 200 can be minimized in accordance with a combination between the source gain G1 of the second source device and the sink gain G2 of the different sink device 200. Further, the adjustment value calculator 440 may also calculate the output adjustment value D2 associated with the sink gain G2 of the sink device 400 so as to minimize the variation value for the ultimate sink gain of the sink device 400 during the switching, based on the source gain G1 of the changed second source device.

The media source having such a changed source gain G1 is input to the sink device 400 through the signal input section 460. The input media source is output to the outside of the sink device 400 via the signal processor 480.

The signal processor 480 outputs the media source to the output apparatuses such as the display panel, the loudspeaker, etc. after changing the sink gain G2 associated with the main properties of the input media source on the basis of the sink adjustment value D2. In other words, the sink gain G2 is changed since the source gain G1 of the media source to be input to the signal input section 460 has already been changed, thereby outputting the ultimate output level L to the user.

Figure 15:
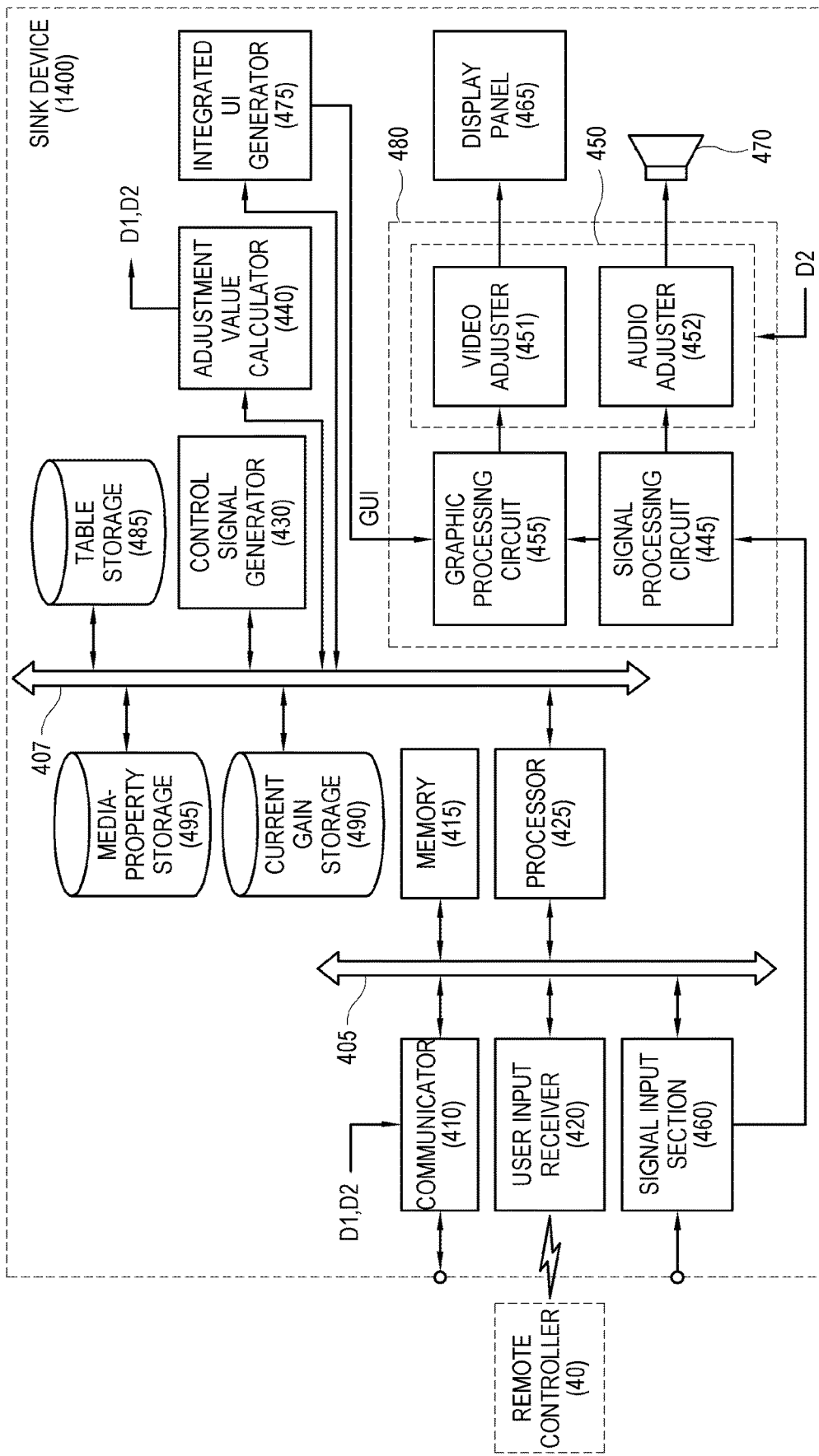
FIG. 15 is a block diagram of a sink device having a function of a media output-level control apparatus according to an embodiment.

FIG. 15 is a block diagram of a sink device 1400 according to an embodiment. The sink device 1400 may include the communicator 410, the user input receiver 420, the processor 425, the adjustment value calculator 440, the signal processor 480, the signal input section 460 and the storage 499, like those of FIG. 14. Further, the sink device 1400 may additionally include a system bus 405, a processor bus 407, a memory 415, an integrated UI generator 475, and a control signal generator 430. In addition, the storage 499 may include a current gain storage 490, a media-property storage 495, and a table storage 485. Further, the signal processor 480 may include a graphic processing circuit 455, a signal processing circuit 445, and a sink gain adjuster 450.

The processor 425, the memory 415, the communicator 410, the user input receiver 420, and the signal input section 460 may be connected to the system bus 405. Likewise, the processor 425, the integrated UI generator 475, the adjustment value calculator 440, the control signal generator 430, the signal processor 480 and various storages 485, 490 and 495 may be connected to the processor bus 407. Below, the sink device 1400 will be described while focusing on differences from the sink device 400 of FIG. 14 and avoiding repetitive descriptions.

The integrated UI generator 475 generates a user interface, in particular, a GUI for allowing a user to adjust the ultimate output level of the sink device 400, and such a generated GUI is provided to the user on the display panel 465 via the graphic processing circuit 455. By referring to the GUI, the user makes a user input signal for changing the ultimate output level L through the user input receiver 420.

In response to the user input signal, the adjustment value calculator 440 calculates the source gain G1 and the sink gain G2 for achieving the ultimate output level L with reference to a mapping table, and calculates the source adjustment value D1 and the sink adjustment value D2 by which the current source gain G1 and the current sink gain G2 will be adjusted.

Then, the control signal generator 430 generates a first control signal involving the source adjustment value D1, and the communicator 410 transmits the first control signal to the source device 100 so that the source device 100 can control the source gain G1 of the media source as much as the source adjustment value D1. Further, the control signal generator 430 generates a second control signal involving the source adjustment value D2 associated with a different sink device 200, and the communicator 410 transmits the second control signal to the different sink device 200 so that the different sink device 200 can control the sink gain G2 of the media source as much as the sink adjustment value D2.

The media source having such a changed source gain G1 is input to the sink device 400 through the signal input section 460. The input media source is input to the sink gain adjuster 450, which includes a video adjuster 451 and an audio adjuster 452, through the signal processing circuit 445. The media source will be input to the audio adjuster 452 when the media properties of the media source to be changed are audio properties such as volume, and will be input to the video adjuster 451 when the media properties to be changed are video properties such as brightness.

The sink gain adjuster 450 changes the sink gain G2 associated with the media properties of the input media source on the basis of the sink adjustment value D2, and outputs the media source to the display panel 465 or the loudspeaker 470. That is, the sink gain G2 is changed since the source gain G1 of the media source input to the signal input section 460 has already been changed, thereby outputting the ultimate output level L to a user. If the sink adjustment value D2 is related to a different sink device 200 instead of the sink device 1400, the sink adjustment value D2 will be transmitted in association with the second control signal to the different sink device 200 through the communicator 410.

The table storage 485, the current gain storage 490, and the media-property storage 495 are respectively equivalent to the table storage 355, the current gain storage 370, and the media-property storage 360 of the media output-level control apparatus 2300 of FIG. 13, and thus repetitive descriptions thereof are omitted.

Figure 16:
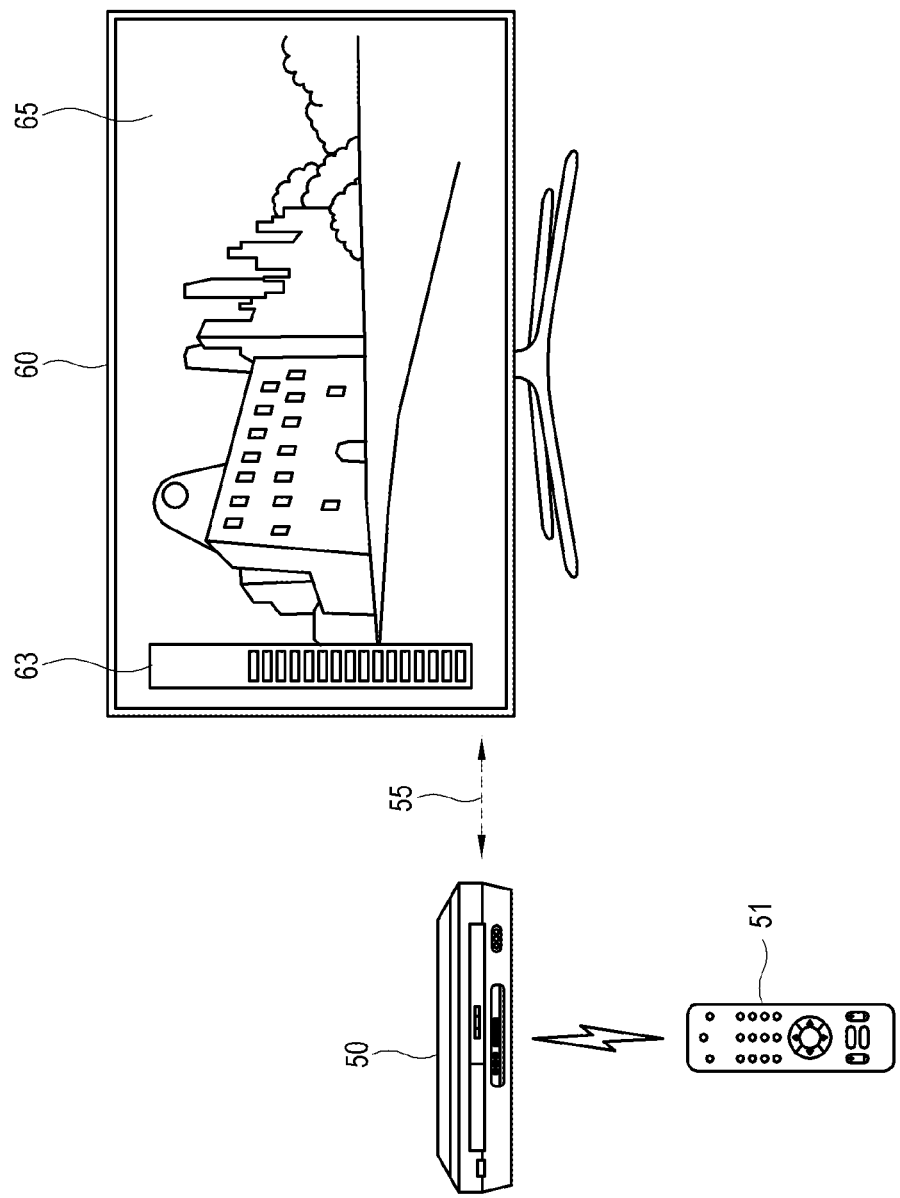
FIGS. 16 and 17 are views illustrating a conventional example of individually controlling a source gain and a sink gain.
Figure 17:
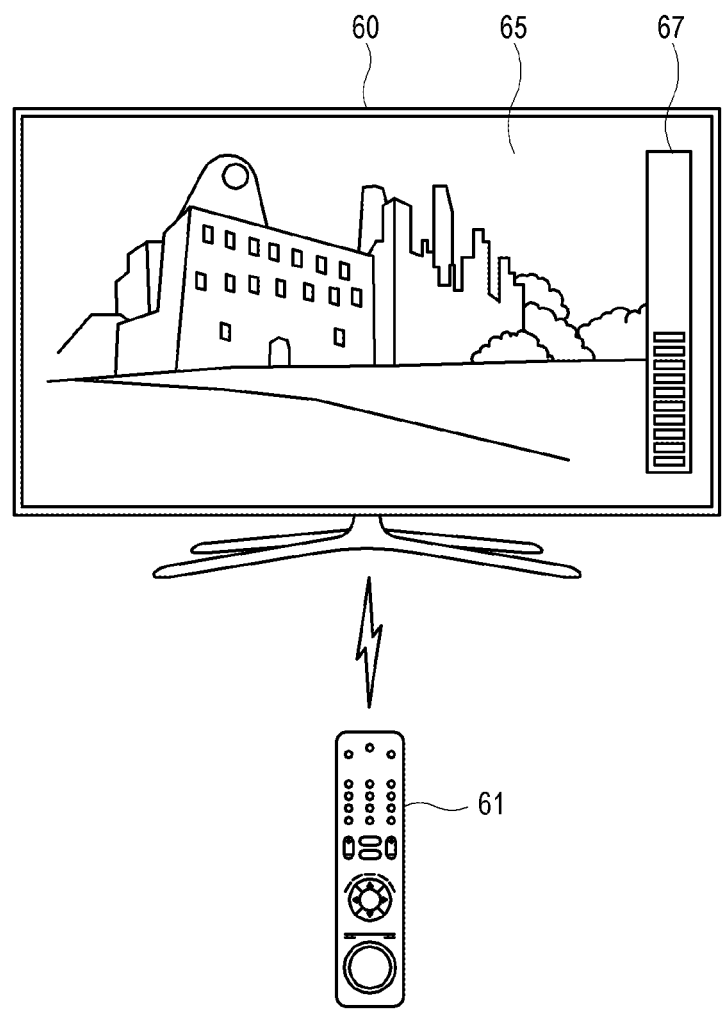
Figure 18:
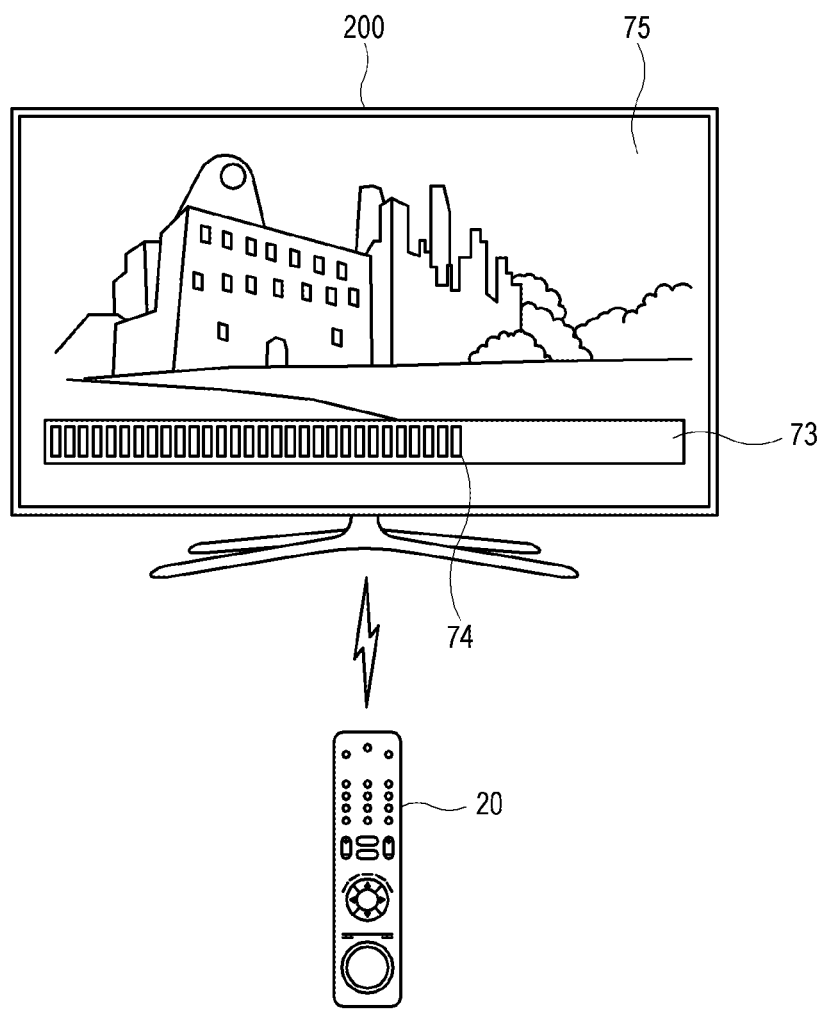
FIG. 18 is a view illustrating an example of controlling an ultimate output level through an integrated UI according to an embodiment.

FIGS. 16 and 17 are diagrams illustrating a conventional example of individually controlling a source gain and a sink gain, and FIG. 18 is a diagram illustrating an example of controlling an ultimate output level through an integrated UI according to an embodiment. Here, a sink device is illustrated as a display device capable of outputting images and sound.

Referring to FIGS. 16 and 17, a user may use a first remote controller 51 to adjust a source gain of a source device 50, as shown in FIG. 16. In this case, a source gain UI 63 for showing a current level and a variation process of the source gain may be displayed on a screen 65 of the sink device 60, and a user may adjust the source gain to a desired level through the source gain UI 63. Along with the source media, the source gain UI 63 may be provided from the source device 50 through the media transmission channel 55.

Meanwhile, a user may use a second remote controller 61 to adjust the sink gain of the sink device 60, as shown in FIG. 17. In this case, a sink gain UI 67 for showing a current level and a variation process of the sink gain may be displayed on the screen 65 of the sink device 60. A user may adjust the sink gain to a desired level through the sink gain UI 67.

According to the gain control method as shown in FIGS. 16 and 17, a user has to individually adjust the source gain of the source device and the sink gain of the sink device in order to obtain an ultimate output level of certain media properties as desired. In particular, if the individual adjustment of the source gain or the sink gain is insufficient to obtain the desired ultimate output level, additional control is needed for adjusting the other gain. The additional control is also necessary even when a single integrated remote controller is used to eliminate inconvenience of using the individual remote controllers 51 and 61. Thus, a user has to individually control a source gain adjustment button and a sink gain adjustment button arranged on the integrated remote controller.

In contrast, FIG. 18 illustrates an integrated UI 73 according to an embodiment. When the media properties are selected by a user, the integrated UI 73 for selecting the ultimate output level is displayed on a screen 75 of the sink device 200. The integrated UI 73 may be displayed in an overlapping manner with a media source displayed on the screen 75, and include a gauge 74 for indicating the ultimate output level of the media properties associated with the media source. FIG. 18 illustrates that the integrated UI 73 is displayed with a rectangular gauge formed in a lower portion on the screen 75, but other display forms are possible. Alternatively, the arranged position and shape of the integrated UI may be provided in various ways.

The user may use the remote controller 20, or another input device, to adjust the ultimate output level L of the sink device 200 through the integrated UI 73, thereby reducing a need to individually control the source gain G1 of the source device 100 and the sink gain G2 of the sink device 200. The ultimate output level L, i.e., the output strength of the media output from the sink device 200, is determined by a combination of the source gain G1 of the source device 100 and the sink gain G2 of the sink device 200.

In this way, a user is allowed to precisely adjust the ultimate output level within a wider adjustment range through the integrated UI 73. The integrated UI provides a wide control range extended from a control range for the source gain G1 and a control range for the sink gain G2, and thus a user can perform more detailed output control.

FIG. 18 illustrates the display apparatus as the sink device 200, but it should be understood that other types of sink devices 200 are possible. Alternatively, the sink device 200 may be an audio output apparatus that does not include a screen for displaying an image. Such an audio output apparatus may, for example, display the ultimate output level through the integrated UI displayed on a control panel with an LCD display window.

Below, detailed embodiments, in which the media output-level control apparatus 300 or the sink device 400 having the function of the media output-level control apparatus controls the ultimate output level in an environment where the plurality of source devices 100a and 100b and the plurality of sink devices 200a and 200b are present, will be described with reference to FIGS. 19 to 26.

Figure 19:
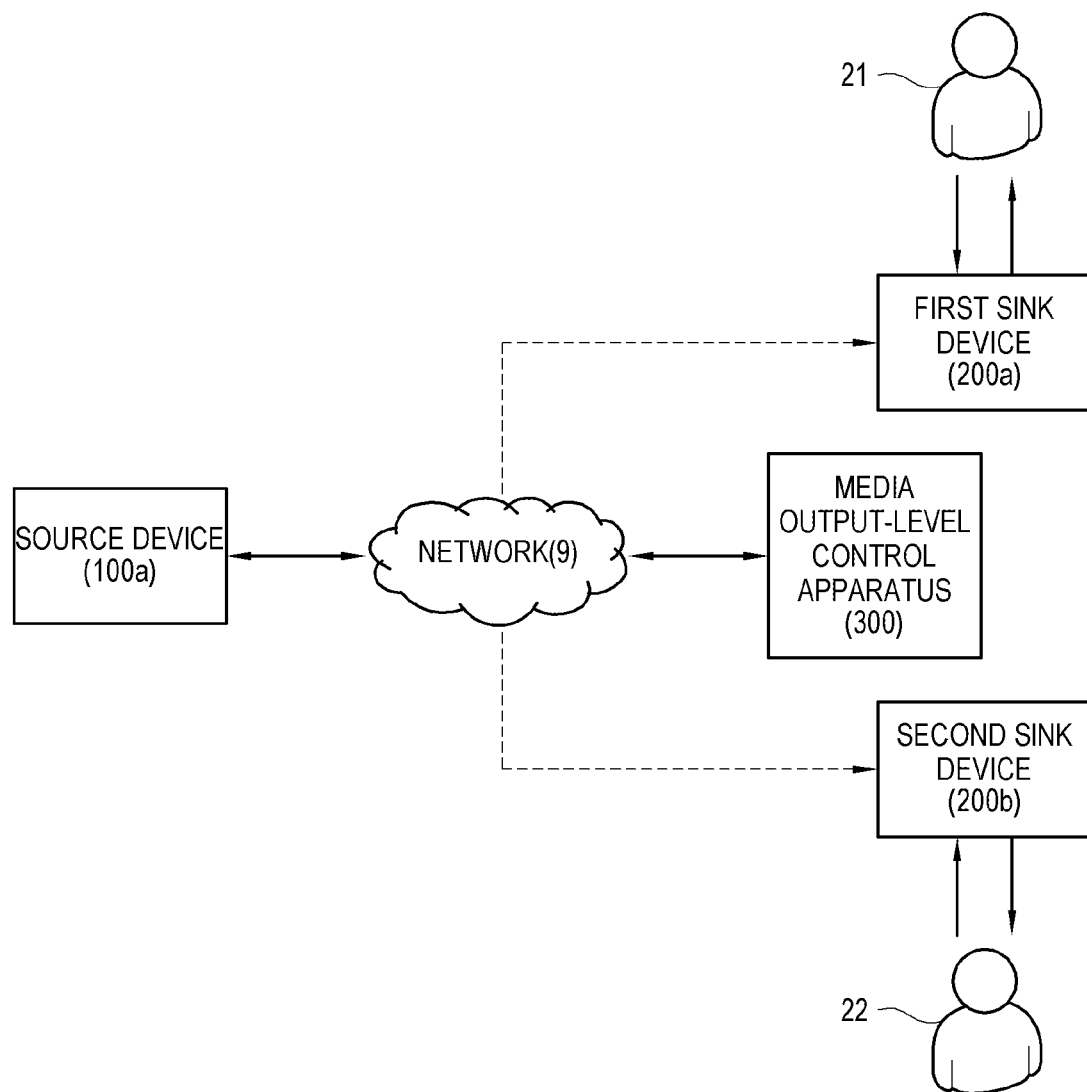
FIGS. 19 and 20 are a block diagram and a flowchart illustrating an embodiment of controlling an ultimate output level under an environment where a plurality of sink devices approaches one source device.
Figure 20:
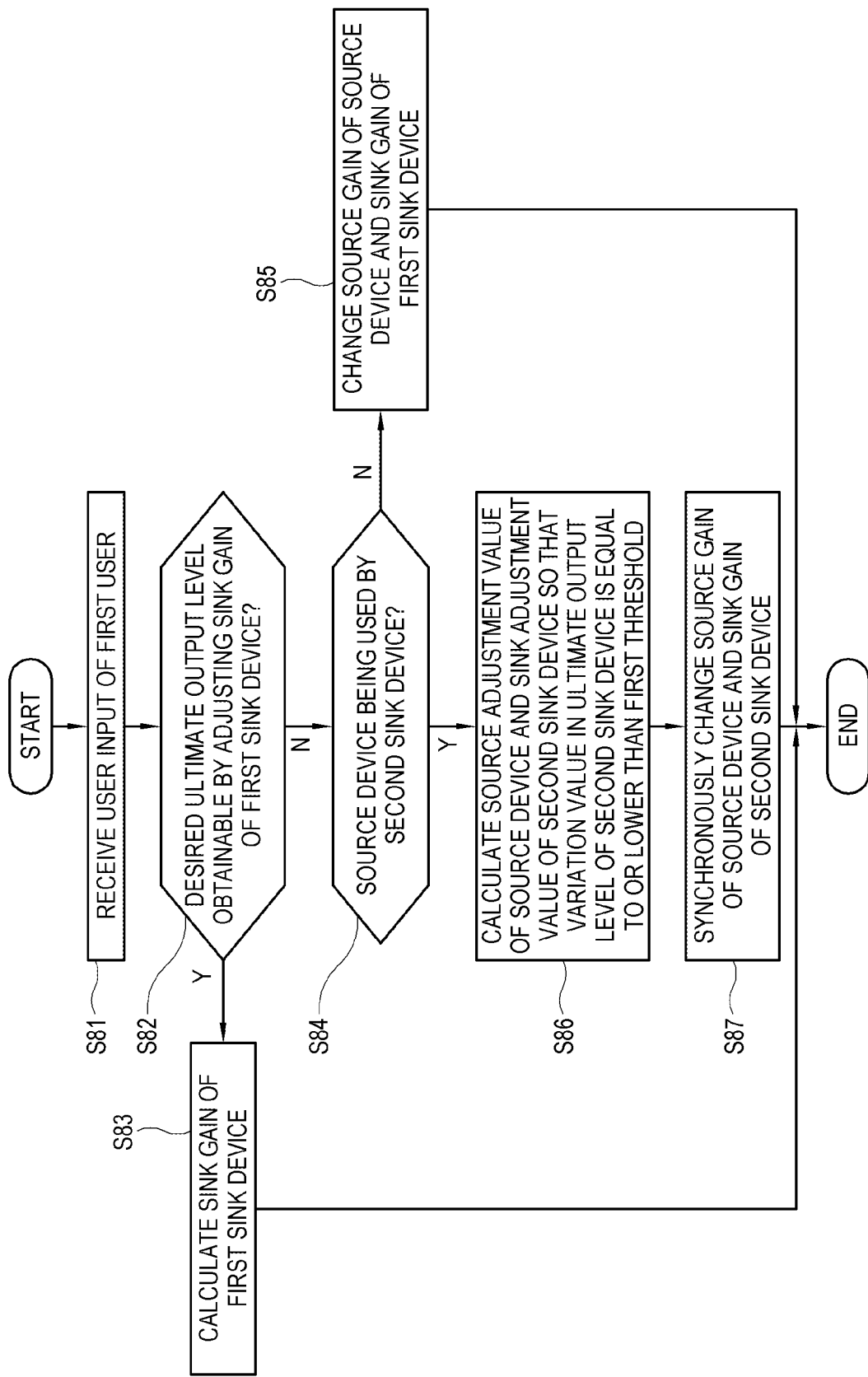

First, FIGS. 19 and 20 are, respectively, a block diagram and a flowchart illustrating an embodiment of controlling an ultimate output level in an environment including a plurality of sink devices and a single source device. As shown in FIG. 19, users 21 and 22 correspond to the plurality of sink devices 200a and 200b, and the users 21 and 22 are using the sink devices 200a and 200b to view or listen to the media source provided from the source device 100a.

The source device 100a, the sink devices 200a and 200b, and the media output-level control apparatus 300 are all connectable through a network 9. Here, the network 9 may be achieved by various types such as a cable, Ethernet, Wi-Fi, etc., and may be applied to not only the home network 1 but also a WAN, or the like, other than the home network 1. For example, the network 9 may be the Internet, a cellular network, or a WAN in a situation where a plurality of users, who have their own sink devices 200a and 200b, are within communicative proximity to the source device 100a while the source device 100a is connected to a remote system such as an IP router, etc., in a home. Although it is not illustrated, the network may be internally provided with a switch, a router, an access point, or the like, for relaying communication between the devices within the network 9. The source device 100a, the sink devices 200a and 200b, and the media output-level control apparatus 300 may communicate with each other via the network device, or may directly communicate with each other without the network device.

In such an environment where the plurality of users who employ the plurality of sink devices 200 are within communicative proximity to a single source device 100a, when a first user 21 changes the ultimate output level of certain media properties (e.g., volume) and thus causes the source gain G1 of the source device 100a to be changed, a second user 22 may experience discomfort due to the ultimate output level being changed regardless of his/her own intention. To not only alleviate the discomfort but also satisfy the request of the first user 21, the media output-level control apparatus 300 generates and transmits the first control signal for changing the source gain G1 of the source device 100a and the second control signal for changing the sink gain G2 of the second sink device 200b.

A process of controlling the ultimate output level will be described in more detail with reference to the flowchart of FIG. 20.

First, the user input receiver 220 of the first sink device 200a receives a user input from the first user 21, i.e., an ultimate output level La desired for the first sink device 200a (S81). The media output-level control apparatus 300 receives the desired ultimate output level La through the communicator 310.

Next, the adjustment value calculator 340 of the media output-level control apparatus 300 determines whether the ultimate output level La desired for the first sink device 200a is obtainable by only changing the sink gain G2a of the first sink device 200a (S82). If the ultimate output level La desired for the first sink device 200a is obtainable by only changing the sink gain G2a ('Y' at S82), then the adjustment value calculator 340 calculates the sink gain G2a (S83). In this case, the adjustment of only the sink gain G2a is sufficient to obtain the ultimate output level La, and the process ends.

Alternatively, if the ultimate output level La desired for the first sink device 200a is not obtainable by only changing the sink gain G2a ('N' at S82), then the adjustment value calculator 340 may calculate both the source gain G1 of the source device 100a and the sink gain G2a of the first sink device 200a. In this case, the adjustment value calculator 340 performs the subsequent operation of determining whether the source device 100a is being used by the second sink device 200b (S84). If the source device 100a is not being used by the second sink device 200b ('N' at S84), then there are no users 22 who might experience discomfort due to the change in the source gain G1 of the source device 100a, and thus the adjustment value calculator 340 transmits a control signal for changing the source gain G1 of the source device 100a and the sink gain G2a of the first sink device 200a, thereby controlling the ultimate output level La of the first sink device 200a to be output as desired by the first user 21 (S85).

When it is determined in the operation S84 that the source device 100a is being used by the second sink device 200b ('Y' at S84), then the adjustment value calculator 340 calculates both the source adjustment value D1 of the source device 100a and the sink adjustment value D2b of the second sink device so that the ultimate output level La of the first sink device 200a can satisfy the requirements of the user input signal and a variation value in an ultimate output level Lb of the second sink device 200b does not exceed a predetermined first threshold. The first threshold refers to a margin of variation in the ultimate output level Lb of the second sink device 200b. For example, the margin of variation in the ultimate output level Lb may be imperceptible to the second user. The first threshold may be empirically determined.

In this way, it is possible to change the source gain G1 of the source device 100a because the second user 22 might not recognize the change in the ultimate output level Lb of the second sink device 200b as long as the variation value in the ultimate output level Lb of the second sink device 200b, which depends on the adjustment in the source gain G1 of the source device 100a, does not exceed the first threshold.

When a plurality of combinations is possible between the source adjustment value D1 corresponding to the source gain G1 of the source device 100a and the sink adjustment value D2b corresponding to the sink gain G2b of the second sink device 200b while satisfying the first threshold, which of the combinations will be preferentially selected is as follows.

Although there may be many criteria for selecting one combination among the plurality of combinations satisfying the first threshold, some criteria according to an embodiment will be proposed.

(1) The combination is selected to minimize the variation value in the source gain G1 of the source device 100a.

(2) The combination is selected to minimize the variation value in the ultimate output level Lb of the second sink device 200b.

Only one between the two criteria may be used. Alternatively, one of the two criteria may be met first, and the other is used as an additional criterion when a plurality of candidate combinations appears.

In this way, the adjustment value calculator 340 calculates a combination between the source adjustment value D1 corresponding to the source gain G1 and the sink adjustment value D2b corresponding to the sink gain G2b to satisfy the first threshold (S86). Then, the first control signal having the source adjustment value D1 is transmitted to the source device 100a, and the second control signal having the sink adjustment value D2b is transmitted to the second sink device 200b. In this case, the sink adjustment value D2a of the first sink device 200a, by which the ultimate output level La desired by the user 21 of the first sink device 200a is achieved, is also calculated on the basis of the calculated source adjustment value D1, and the second control signal having the calculated sink adjustment value D2a is transmitted to the first sink device 200a.

Then, the source gain G1 of the source device 100a is changed based on the source adjustment value D1, and the sink gain G2b of the second sink device 200b is changed based on the sink adjustment value D2b (S87). Likewise, the sink gain G2a of the first sink device 200a is changed based on the sink adjustment value D2a.

Figure 21:
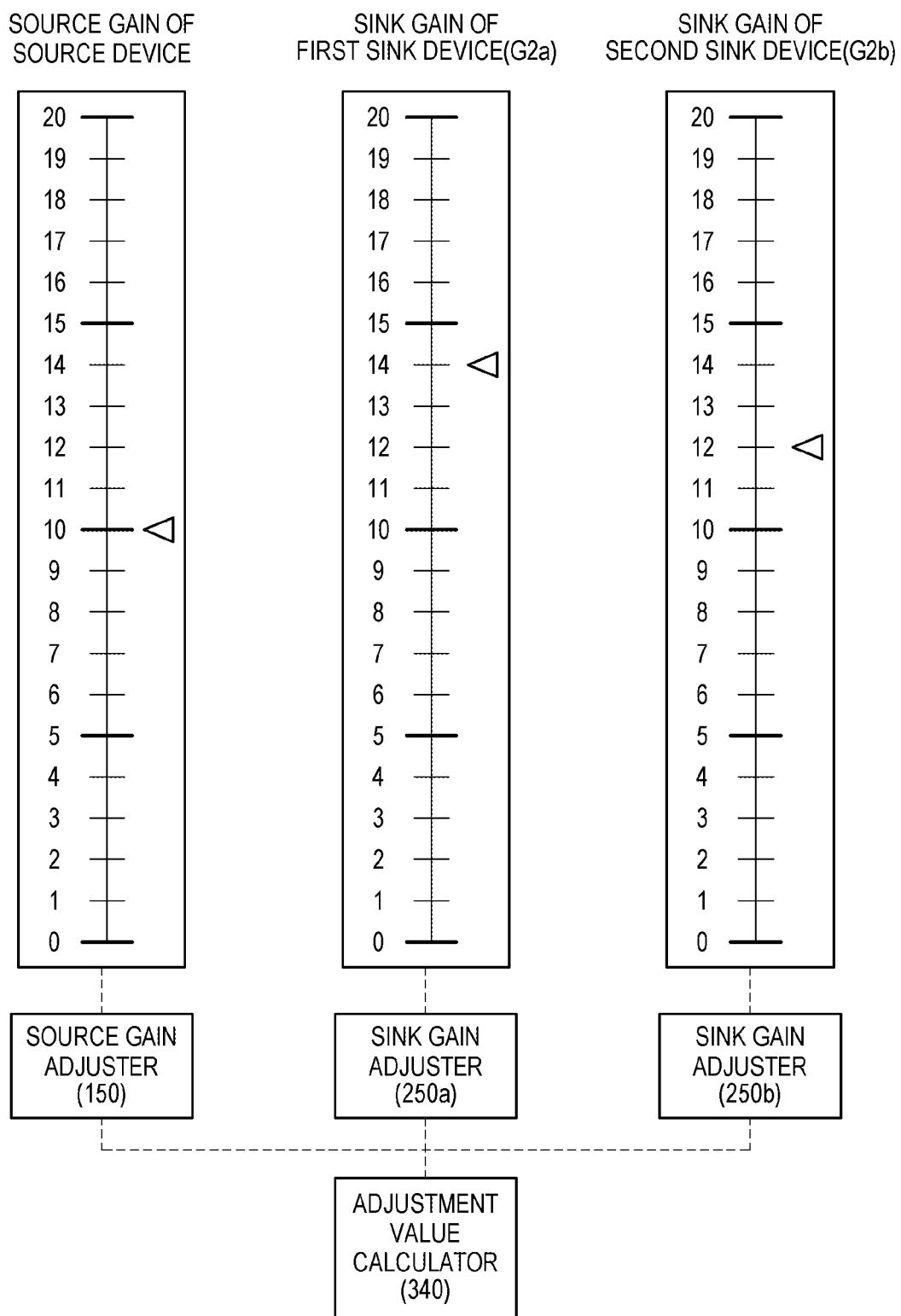
FIGS. 21 to 24 are views illustrating detailed scenarios of adjusting a source gain and a sink gain.

Some scenarios of adjusting the source gain and the sink gain will be described in detail with reference to FIGS. 21 to 24. Here, descriptions will be made on the assumption that the ultimate output level L can be simply represented with the product of the source gain and the sink gain (G1*G2). Referring to FIG. 21, the source device 100a has a source gain G1 of "10", the first sink device 200a has a sink gain G2a of "14", and the second sink device 200b has a sink gain G2b of "12". Therefore, in this case, the first sink device 200a has an ultimate output level La of "140", and the second sink device 200b has an ultimate output level Lb of "120".

Figure 22:
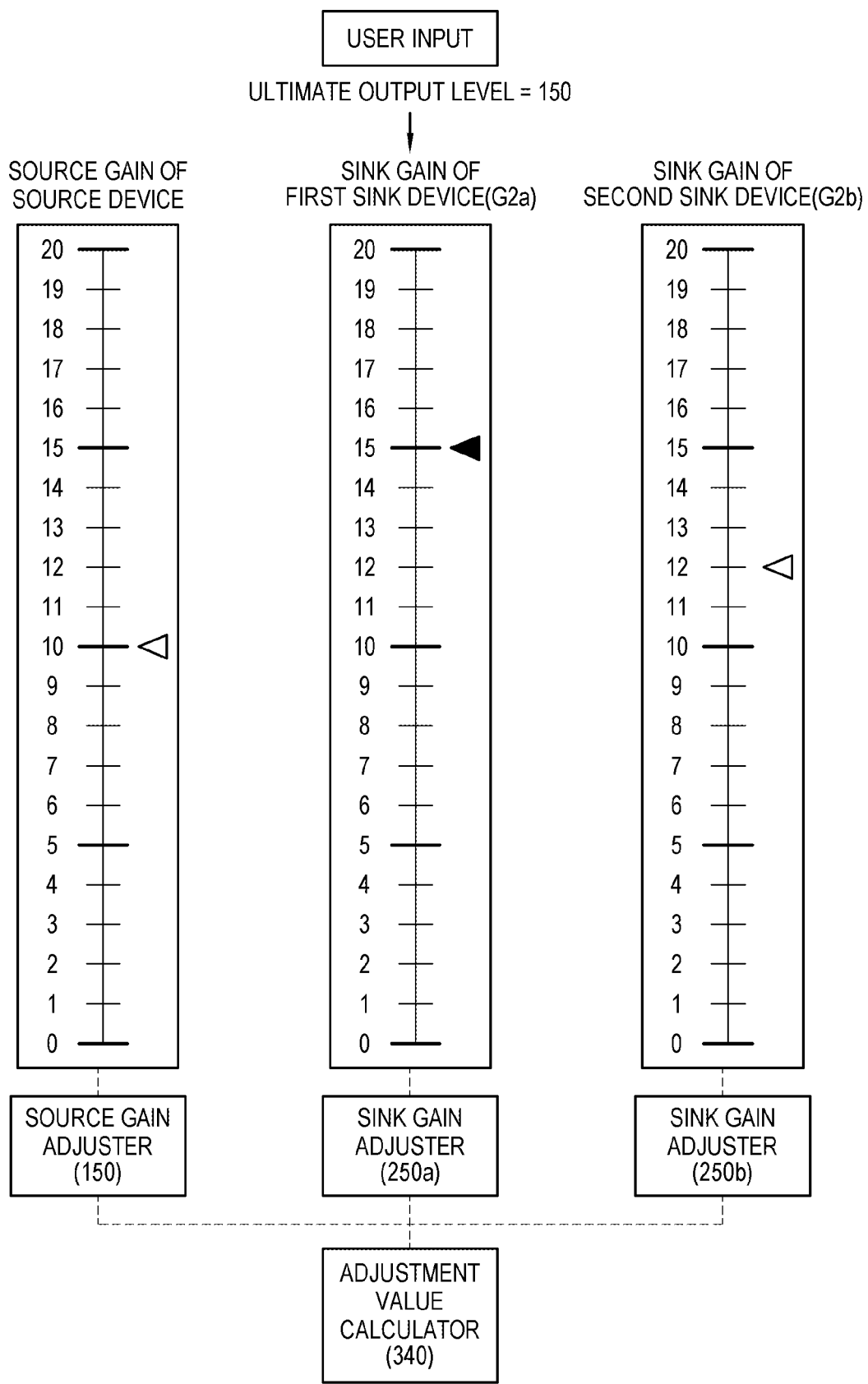

Next, as shown in FIG. 22, a user input is received to set the ultimate output level La of the first sink device 200a to "150". First, the adjustment value calculator 340 determines whether a desired level is achievable by only changing the sink gain G2a of the first sink device 200a. When the adjustment value calculator 340 determines that the desired level of "150" is achievable by changing the sink gain G2a into "15" without changing the source gain G1, the second control signal is transmitted to the first sink device 200a so that the sink adjustment value D2a associated with the sink gain G2a of the first sink device 200a can be represented with "+1". Below, it will be described that the adjustment value is represented by a variation value of "+1" rather than a result value of "15".

Figure 23:
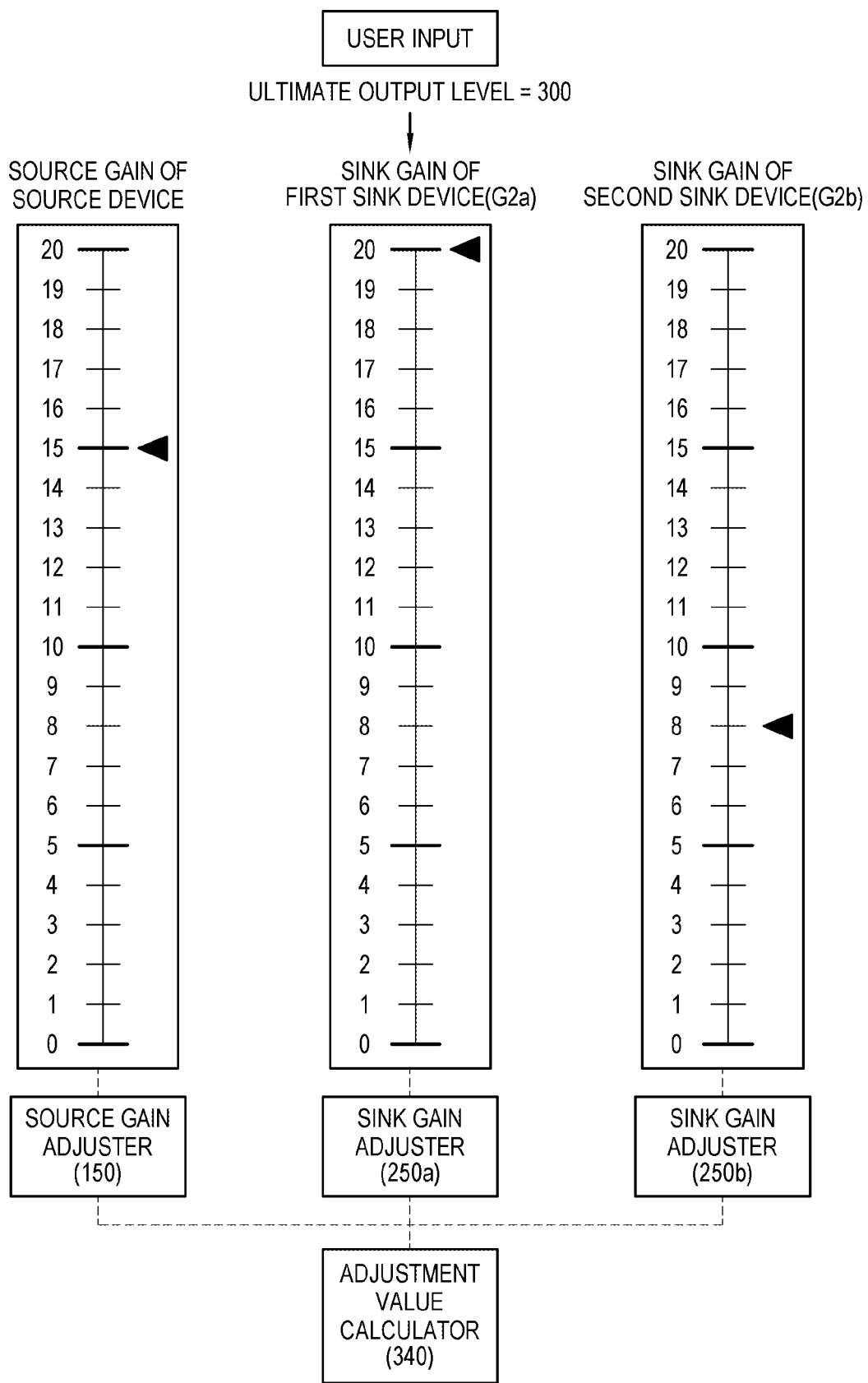

Referring to FIG. 23, a user input is received to set the ultimate output level La of the first sink device 200a to "300". In this case, adjustment in only the sink gain G2a of the first sink device 200a, without adjusting the source gain G1, reaches an ultimate output level La of "200". Therefore, the adjustment value calculator 340 calculates a combination between the source gain G1 and the sink gain G2a, in which the source gain G1 of the source device 100a has a minimum variation. Thus, the adjustment value calculator 340 transmits a first control signal for representing the source adjustment value D1 associated with the source gain G1 with "+5" to the source device 100, and transmits a second control signal for representing the sink adjustment value D2a associated with the sink gain G2a with "+5" to the first sink device 200a. In addition, the adjustment value calculator 340 transmits a second control signal for representing the sink adjustment value D2b associated with the sink gain G2b with "−4" to the second sink device 200b. As a result, the ultimate output level La of the first sink device 200a is changed to "300", and substantially concurrently, the ultimate output level Lb of the second sink device 200b is maintained at "120".

Figure 24:
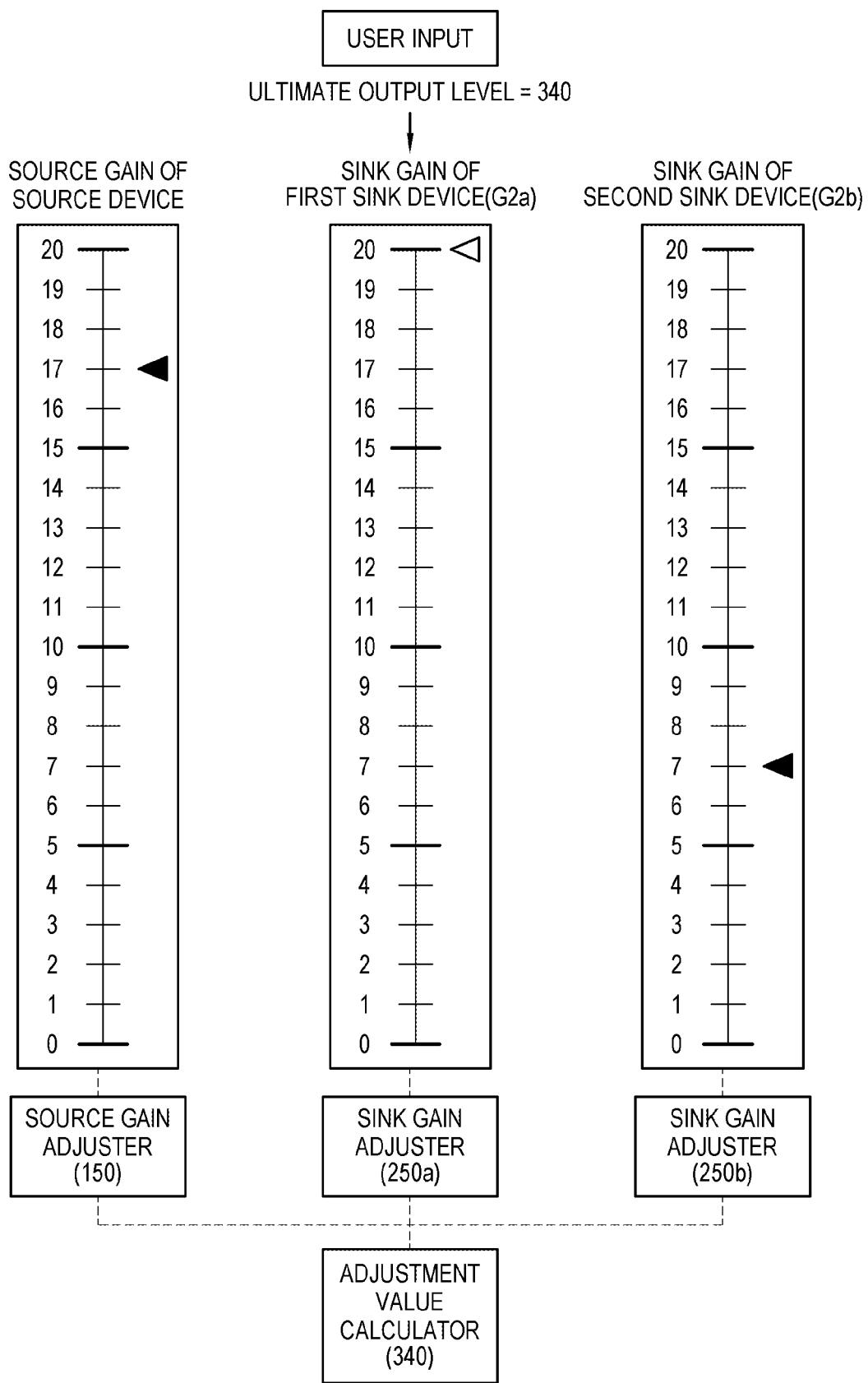

As shown in FIG. 24, a user input is received to set the ultimate output level La of the first sink device 200a to "340". In this case, individual adjustment in the sink gain G2a of the first sink device 200a is insufficient to obtain the desired ultimate output level without adjusting the source gain G1. Therefore, the adjustment value calculator 340 calculates a combination between the source gain G1 and the sink gain G2a, in which the source gain G1 of the source device 100a has the minimum variation in the source gain G1. The adjustment value calculator 340 transmits a first control signal for representing the source adjustment value D1 associated with the source gain G1 with "+2" to the source device 100. In addition, the adjustment value calculator 340 transmits a second control signal for representing the sink adjustment value D2b associated with the sink gain G2b with "−1" to the second sink device 200b. As a result, the ultimate output level La of the first sink device 200a is changed to "340", and substantially concurrently, the ultimate output level Lb of the second sink device 200b is "119" as reduced by "1". Meanwhile, under a condition that the first threshold is "3" within which the second user 22 does not recognize a variation in volume, the reduction does not exceed the first threshold and thus satisfies the foregoing criteria.

Figure 25:
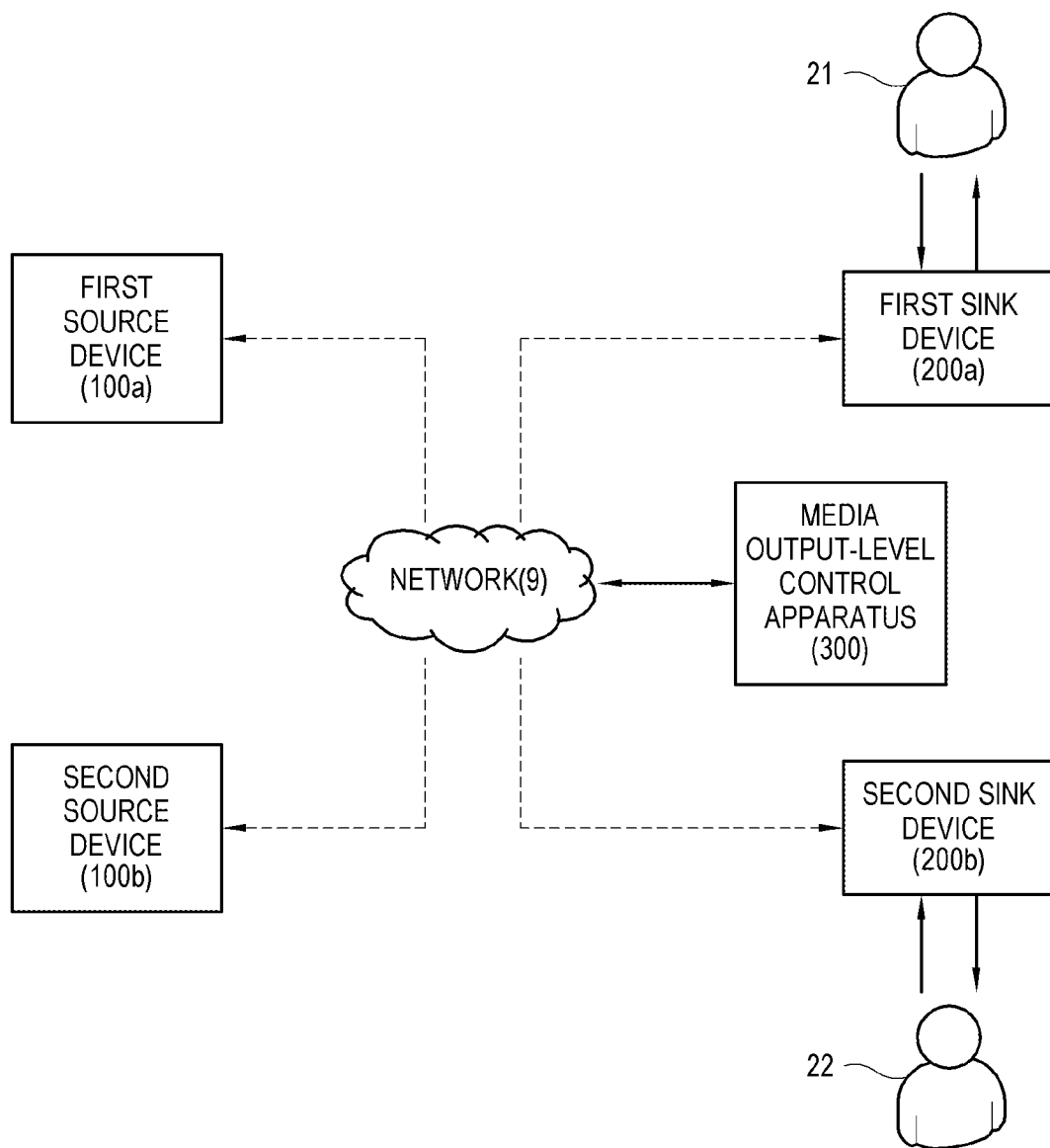

FIGS. 25 and 26 are, respectively, a block diagram and a flowchart illustrating an embodiment of controlling an ultimate output level under a condition that a plurality of source devices and a plurality of sink devices are present, and a first sink device is switched over from connection with a first source device to connection with a second source device. Referring to FIG. 25, shown are the plurality of source devices 100a and 100b, and the plurality of sink device 200a and 200b. Users 21 and 22 may use their own sink devices 200a and 200b to view the media source and/or listen to the media sources provided from the source device 100a or the source device 100b.

Here, the user 21 of the first sink device 200a, who is viewing the media source from the first source device 100a, switches a connection over to a connection with the second source device 100b to view another media source from the second source device 100b. In this case, a problem does not arise when a second sink device 200b is not connected to the second source device 100b. Alternatively, when there is a second sink device 200b that is connected to the second source device 100b, there is a need of avoiding a collision between the first sink device 200a and the second sink device 200b. A control method of avoiding the collision will be described in more detail with reference to the flowchart of FIG. 26.

First, the first sink device 200a is switched over from a connection with the first source device 100a to a connection with the second source device 200b (S91). Then, the adjustment value calculator 340 searches for a case (e.g., values) where the variation value in the ultimate output level La does not exceed the first threshold with only a change in the sink gain G2a of the first sink device 200a (S92). In this case, the adjustment value calculator 340 calculates the sink adjustment value D2a associated with the sink gain G2a of the first sink device 200a.

Next, the adjustment value calculator 340 determines whether only the change in the sink gain G2a of the first sink device 200a is sufficient to obtain the ultimate output level La of the first sink device 200a (S93), and, if only the change in the sink gain G2a of the first sink device 200a is sufficient to obtain the ultimate output level La ('Y' at S93), the adjustment value calculator 340 calculates the sink gain G2a (S94). In this case, the ultimate output level La is obtained by adjusting only the sink gain G2a, and thus the process ends.

However, if only the change in the sink gain G2a of the first sink device 200a is not sufficient to obtain the ultimate output level La ('N' at S93), the adjustment value calculator 340 calculates both the source gain G1b of the second source device 100b and the sink gain G2a of the first sink device 200a. In this case, the adjustment value calculator 340 determines whether the second source device 100b is being used by another sink device (e.g., the second sink device 200b) (S95). If the second source device 100b is not being used by another sink device ('N' at S95), then there are no users 22 who might experience discomfort due to the change in the source gain G1 of the source device 100a, and thus the adjustment value calculator 340 transmits a control signal for changing the source gain G1b of the second source device 100b and the sink gain G2a of the first sink device 200a, thereby controlling the ultimate output level La of the first sink device 200a to be equal to or lower than the first threshold (S96).

When it is determined in the operation S95 that the second source device 100b is being used by the second sink device 200b ('Y' at S95), the adjustment value calculator 340 calculates both the source adjustment value D1b of the second source device 100b and the sink adjustment value D2b of the second sink device 200b during the switching so that a variation value in the ultimate output level La of the first sink device 200a does not exceed the first threshold and a variation value in the ultimate output level Lb of the second sink device 200b does not exceed a predetermined second threshold.

In this way, it is possible to change the source gain G1b of the second source device 100b because the second user 22 might not experience discomfort as long as the variation value in the ultimate output level Lb of the second sink device 200*b* does not exceed the second threshold even though the source gain G1*b* of the second source device 100*b* is adjusted.

When a plurality of combinations is possible between the source adjustment value D1*b* corresponding to the source gain G1*b* of the second source device 100*b* and the sink adjustment value D2*b* corresponding to the sink gain G2*b* of the second sink device 200*b* while satisfying the second threshold, there may be used the foregoing criteria such as (1) a criterion for selecting a combination to minimize the variation value in the source gain G1*b* of the second source device 100*b*, and (2) a criterion for selecting a combination to minimize the variation value in the ultimate output level Lb of the second sink device 200*b*.

Thus, the adjustment value calculator 340 calculates a combination between the source adjustment value D1*b* corresponding to the source gain G1*b* and the sink adjustment value D2*b* corresponding to the sink gain G2*b* without exceeding the second threshold (S97). Then, the first control signal having the source adjustment value D1*b* is transmitted to the second source device 100*b*, and the second control signal having the sink adjustment value D2*b* is transmitted to the second sink device 200*b*. In this case, the sink adjustment value D2*a* of the first sink device 200*a* is also calculated along with the calculated source adjustment value D1*b* so that the variation value of the first sink device 200*a* does not exceed the first threshold due to the switching of the source device, and the second control signal including the sink adjustment value D2*a* is also transmitted to the first sink device 200*a*.

Then, the source gain G1*b* of the second source device 100*b* is changed by the source adjustment value D1*b*, and the sink gain G2*b* of the second sink device 200*b* is changed by the sink adjustment value D2*b*. Likewise, the sink gain G2*a* of the first sink device 200*a* is changed by the sink adjustment value D2*a* (S98). It is preferable that the source gain G1*b*, the sink gain G2*a* and the sink gain G2*b* are synchronously changed. When the source gain G1*b*, the sink gain G2*a* and the sink gain G2*b* are asynchronously changed, the users 21 and 22 may experience discomfort due to instantaneous variation in volume.

The embodiments shown in FIGS. 19, 20, 25, and 26 illustrate that the media output-level control apparatus 300, 1300, 2300 is provided separately from the source device 100 or the sink device 200, like those of FIGS. 11 to 13. However, the sink device 400 (see FIG. 14) and 1400 (FIG. 15) according to an alternative embodiment may include the function of the media output-level control apparatus 300, 1300, 2300. In this case, it will be understood that the adjustment value calculator 340 is replaced by the adjustment value calculator 440, and the first sink device 200 and the media output-level control apparatus 300, 1300, 2300 are integrated into and replaced by the sink device 400, 1400.

The foregoing elements of FIGS. 6 to 15 may be materialized by software such as a task, a class, a subroutine, a process, an object, an execution thread, or a program; hardware such as a field programmable gate array (FPGA) or an application specific integrated circuit (ASIC); or a combination of the software, hardware, and/or firmware. Also, the aforementioned embodiments may be embodied in the form of a recording medium including instructions executable by a computer, such as a program module, executed by a computer. The computer-readable medium may be any recording medium that may be accessed by a computer and may include volatile and non-volatile media and removable and non-removable media. The computer-readable medium may include a non-transitory computer-readable medium that stores one or more instructions that, when executed by one or more processors, cause the one or more processors to perform operations associated with embodiments described herein. Also, the computer-readable medium may include computer storage media and communication media. The computer storage media include volatile and non-volatile and removable and non-removable media implemented using any method or technology to store information such as computer-readable instructions, data structures, program modules, or other data. The communication media include computer-readable instructions, data structures, program modules, or other data in a modulated data signal, or other transport mechanisms and include any delivery media.

Further, each block may indicate a part of a module, a segment or a code, which includes one or more executable instructions for executing a specific logical function(s). Further, in some alternative embodiments, the functions mentioned in the blocks may be implemented out of sequence. For example, two blocks illustrated in a row may be actually performed synchronously, or sometimes the blocks may be implemented in reverse order according to corresponding functions.

According to such embodiments, it is advantageous to concurrently meet the needs of many users with regard to an output control level of media without interference under a multi-user-device environment.

Further, according to the embodiments, user convenience is improved since a user can adjust specific media properties through an integrated UI concurrently without needing to individually control the source device and the sink device.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A device for controlling a media output level, the device comprising:
   communication circuitry configured to communicate with a source device that is configured to provide media content and a sink device that is configured to output the media content provided from the source device;
   a memory configured to store at least one program; and
   a processor configured to execute the at least one program to:
      receive a request for adjusting a media output level of the sink device from the sink device through the communication circuitry;
      identify a source adjustment value and a sink adjustment value for adjusting a source gain of the source device and a sink gain of the sink device, respectively, based on the received request; and
      control the communication circuitry to transmit a control signal to permit the source gain to be adjusted based on the source adjustment value and the sink gain to be adjusted based on the sink adjustment value to the source device and the sink device, respectively, wherein the media output level of the sink device is adjusted based on the adjusted source gain and the adjusted sink gain.

2. The device according to claim 1, wherein the processor is configured to:
generate a user interface (UI) that permits a user of the device to adjust the media output level; and
provide the UI to the sink device.

3. The device according to claim 1, wherein the processor is configured to:
store an updated source gain based on the adjusted source gain, and store an updated sink gain based on the adjusted sink gain.

4. The device according to claim 3, wherein the processor is configured to:
store a mapping table that includes a correlation between the media output level and the source gain and the sink gain.

5. The device according to claim 4, wherein the mapping table is received from the sink device.

6. The device according to claim 1, wherein the processor is configured to:
store first media properties supported in the source device and second media properties supported in the sink device,
wherein the source gain and the sink gain are gains related to common media properties between the first media properties and the second media properties.

7. The device according to claim 6, wherein the media properties comprise at least one of audio properties or video properties.

8. The device according to claim 7, wherein the audio properties comprise at least one among volume, treble boost, bass boost, reverb, voice amplification, and sound field effects, and the video properties comprise at least one among brightness, contrast, chroma, sharpness, and deblock filtering.

9. The device according to claim 1, wherein
the source device comprises a device for providing the media content received from a communication network or storage medium, and
the sink device comprises an audio output device for outputting sound associated with the media content, and a display device for outputting images associated with the media content.

10. The device according to claim 1, wherein the device is integrated with a hub device for relaying a media transmission channel between the source device and the sink device.

11. The device according to claim 1, wherein the processor is configured to:
identify whether the media output level is capable of being achieved based on only an adjustment of the sink gain; and
selectively transmit, to the source device, another control signal to permit the source gain to be adjusted based on whether the media output level is capable of being achieved based on only the adjustment of the sink gain.

12. The device according to claim 1, wherein the processor is configured to:
identify another sink adjustment value, for adjusting another sink gain of another sink device that is connected to the source device, based on the source adjustment value; and
transmit, to the other sink device, the other sink adjustment value to permit the other sink gain to be adjusted based on the other sink adjustment value.

13. The device according to claim 1, wherein the processor is configured to:
identify that a variation value, associated with another media output level of another sink device that is connected to the source device, satisfies a threshold based on the source adjustment value; and
transmit, to the source device, another control signal to permit the source gain to be adjusted based on the source adjustment value based on identifying that the variation value satisfies the threshold.

14. The device according to claim 13, wherein the processor is configured to:
identify the source adjustment value that permits a minimum variation value associated with the other media output level of the other sink device.

15. The device according to claim 13, wherein the processor is configured to: identify the source adjustment value that permits a minimum variation value associated with the source gain.

16. The device according to claim 13, wherein the processor is configured to:
identify the sink adjustment value based on the source adjustment value.

17. The device according to claim 1, wherein the processor is configured to:
identify a variation value associated with the media output level based on the sink device being switched from being connected to the source device to another source device;
identify whether another sink adjustment value for adjusting the sink gain is capable of causing the variation value to satisfy a threshold; and
selectively identify a source adjustment value for adjusting a source gain of the other source device based on whether the other sink adjustment value is capable of causing the variation value to satisfy the threshold.

18. The device according to claim 1, wherein the processor is configured to:
identify that the sink device is switched from being connected to the source device to another source device, wherein the other source device is connected to another sink device; and
cause respective adjustments in the source gain of the source device, another source gain of the other source device, the sink gain, and another sink gain of the other sink device based on identifying that the sink device is switched from being connected to the source device to the other source device.

19. The device according to claim 1, wherein the processor is configured to:
identify that the sink device is switched from being connected to the source device to being connected to another source device;
identify a source adjustment value of the other source device that permits a variation value in the media output level of the sink device to satisfy a threshold;
identify another sink adjustment value of another sink device that is connected to the other source device that permits a variation value in a media output level of the other sink device to satisfy another threshold; and
cause a source gain of the other source device to be adjusted based on the source adjustment value, and cause a sink gain of the other sink device to be adjusted based on the other sink adjustment value.

20. The device according to claim 19, wherein the processor is configured to:

identify the source adjustment value that permits a minimum variation value in the media output level of the other sink device.

21. The device according to claim 19, wherein the processor is configured to:
identify the source adjustment value and the other sink adjustment value to permit the variation value in the media output level of the other sink device to satisfy the other threshold, and to permit a variation value of a source gain of the other source device to satisfy a gain threshold.

22. The device according to claim 19, wherein the processor is configured to:
identify the sink adjustment value that permits a variation value in the media output level of the sink device to satisfy a threshold.

23. A sink device comprising:
communication circuitry configured to communicate with a source device that is configured to provide media content;
a user input receiver configured to receive a user input;
a memory configured to store at least one program; and
a processor configured to execute the at least one program to:
receive the user input for adjusting a media output level of the sink device through the user input receiver;
identify a source adjustment value for adjusting a source gain of the source device and a sink adjustment value for adjusting a sink gain of the sink device in response to the user input;
control the communication circuitry to transmit, to the source device, a control signal that causes the source gain to be adjusted based on the source adjustment value;
receive, from the source device through the communication circuitry, the media content of which the source gain is adjusted based on the source adjustment value; and
apply the adjusted sink gain to the received media content to permit the received media content to be output in association with the media output level.

24. The sink device according to claim 23, wherein the processor is configured to:
generate a user interface (UI) for allowing a user to adjust the media output level; and
provide the UI for display on a display panel.

25. The sink device according to claim 24, wherein the UI is displayed in a scale of the media output level based on a combination between the adjusted source gain and the adjusted sink gain.

26. The sink device according to claim 23, wherein the processor is configured to:
store an updated source gain based on the adjusted source gain and an updated sink gain based on the adjusted sink gain.

27. A device for controlling a media output level, the device comprising:
communication circuitry configured to communicate with a source device that is configured to provide media content and a sink device that is configured to output the media content;
a memory configured to store at least one program; and
a processor configured to execute the at least one program to:
receive the media content from the source device through the communication circuitry;
based on receiving a request for adjusting a media output level of the sink device from the sink device, identify a source adjustment value for adjusting a source gain of the received media content, and a sink adjustment value for adjusting a sink gain of the sink device;
adjust the source gain of the media content based on the source adjustment value;
control the communication circuitry to transmit the media content, of which the source gain is adjusted based on the source adjustment value, to the sink device; and
control the communication circuitry to transmit, to the sink device, a control signal for requesting the sink gain to be adjusted based on the sink adjustment value and the sink device to output the media content in association with the media output level adjusted based on the adjusted sink gain.

28. A method, comprising:
receiving, by a device and from a sink device, a request for adjusting a media output level of the sink device that is configured to output media content;
identifying, by the device, a source adjustment value and a sink adjustment value for adjusting a source gain of a source device that is configured to provide the media content and a sink gain of the sink device, respectively; and
transmitting, by the device, a control signal to permit the source gain to be adjusted based on the source adjustment value and the sink gain to be adjusted based on the sink adjustment value to the source device and the sink device, respectively,
wherein the media output level of the sink device is adjusted based on the adjusted source gain and the adjusted sink gain.

* * * * *